United States Patent
Hwang et al.

(10) Patent No.: US 12,041,604 B2
(45) Date of Patent: Jul. 16, 2024

(54) METHOD FOR TRANSMITTING OR RECEIVING SIGNALS FOR MULTIPLE TRANSPORT BLOCK SCHEDULING, AND APPARATUS THEREFOR

(71) Applicant: LG Electronics Inc., Seoul (KR)

(72) Inventors: Seunggye Hwang, Seoul (KR); Changhwan Park, Seoul (KR); Joonkui Ahn, Seoul (KR); Jaehyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 17/440,096

(22) PCT Filed: Mar. 27, 2020

(86) PCT No.: PCT/KR2020/004208
§ 371 (c)(1),
(2) Date: Sep. 16, 2021

(87) PCT Pub. No.: WO2020/204489
PCT Pub. Date: Oct. 8, 2020

(65) Prior Publication Data
US 2022/0191899 A1    Jun. 16, 2022

Related U.S. Application Data

(60) Provisional application No. 62/931,814, filed on Nov. 7, 2019.

(30) Foreign Application Priority Data

Mar. 29, 2019 (KR) .................. 10-2019-0036977
Aug. 16, 2019 (KR) .................. 10-2019-0100637
Oct. 4, 2019 (KR) .................. 10-2019-0123007

(51) Int. Cl.
*H04W 72/12*       (2023.01)
*H04L 1/18*        (2023.01)
(Continued)

(52) U.S. Cl.
CPC .......... *H04W 72/1268* (2013.01); *H04L 1/18* (2013.01); *H04B 1/713* (2013.01); *H04L 27/34* (2013.01); *H04W 72/23* (2023.01)

(58) Field of Classification Search
CPC . H04W 72/1268; H04W 72/23; H04W 72/12; H04W 72/1263; H04W 72/535;
(Continued)

(56) References Cited

U.S. PATENT DOCUMENTS

2017/0013626 A1   1/2017  Nan et al.
2019/0059057 A1*  2/2019  Peng .................... H04W 52/146
(Continued)

FOREIGN PATENT DOCUMENTS

WO    WO2018165347    9/2018

OTHER PUBLICATIONS

Extended European Search Report in European Appln. No. 20785328.4, dated Feb. 17, 2022, 8 pages.
(Continued)

*Primary Examiner* — Candal Elpenord
(74) *Attorney, Agent, or Firm* — Fish & Richardson P.C.

(57) ABSTRACT

The present invention relates to a method performed in a wireless communication system, and an apparatus therefor, the method comprising: receiving downlink control information (DCI) for multiple transport block scheduling, the DCI including 1-bit information on a redundancy version (RV) or frequency hopping; if a transport block scheduled by the DCI is not repeated, determining, on the basis of the 1-bit information, an RV value associated with the transport block; and if the transport block scheduled by the DCI is
(Continued)

repeated two or more times, determining, on the basis of the 1-bit information, whether or not frequency hopping is applied to the transport block.

15 Claims, 22 Drawing Sheets

(51) Int. Cl.
*H04W 72/1268* (2023.01)
*H04B 1/713* (2011.01)
*H04L 27/34* (2006.01)
*H04W 72/23* (2023.01)

(58) Field of Classification Search
CPC .......... H04W 4/70; H04L 1/18; H04L 1/1819; H04L 1/1822; H04L 1/1864; H04L 1/1893; H04L 1/1896; H04L 1/08; H04L 1/1812; H04L 5/0012; H04L 5/0053; H04L 5/0044; H04B 1/713
USPC .................................................. 370/329–330
See application file for complete search history.

(56) References Cited

U.S. PATENT DOCUMENTS

| | | | |
|---|---|---|---|
| 2019/0082452 A1* | 3/2019 | Zheng | H04W 72/1268 |
| 2020/0145964 A1* | 5/2020 | Sengupta | H04L 1/0029 |
| 2021/0185672 A1* | 6/2021 | Wang | H04L 5/0007 |
| 2022/0271871 A1* | 8/2022 | Zhou | H04L 1/1671 |

OTHER PUBLICATIONS

Qualcomm Incorporated, "Scheduling of multiple DL/UL transport blocks," R1-1902376, Presented at 3GPP TSG RAN WG1 Meeting #96, Athens, Greece, Feb. 25-Mar. 1, 2019, 7 pages.
International Search Report and Written Opinion in International Appln. No. PCT/KR2020/004208, Jul. 17, 2020, 20 pages (with English translation).
Nokia & Nokia Shanghai Bell, "Scheduling of multiple DL/UL transport blocks," R1-1901965, Presented at 3GPP TSG RAN WG1 Meeting #96, Athens, Greece, Feb. 25-Mar. 1, 2019, 5 pages.
Qualcomm Incorporated, "Scheduling of multiple DL/UL transport blocks," R1-1902368, Presented at 3GPP TSG RAN WG1 Meeting #96, Athens, Greece, Feb. 25-Mar. 1, 2019, 13 pages.
Samsung, "Scheduling of multiple transport blocks for MTC," R1-1902211, Presented at 3GPP TSG RAN WG1 Meeting #96, Athens, Greece, Feb. 25-Mar. 1, 2019, 6 pages.

* cited by examiner (a)                  (b)

METHOD FOR TRANSMITTING OR RECEIVING SIGNALS FOR MULTIPLE TRANSPORT BLOCK SCHEDULING, AND APPARATUS THEREFOR

CROSS-REFERENCE TO RELATED APPLICATIONS

This application is a National Stage application under 35 U.S.C. § 371 of International Application No. PCT/KR2020/004208, filed on Mar. 27, 2020, which claims the benefit of U.S. Provisional Application No. 62/931,814, filed on Nov. 7, 2019, and Korean Application Nos. 10-2019-0123007, filed on Oct. 4, 2019, 10-2019-0100637, filed on Aug. 16, 2019, and 10-2019-0036977, filed on Mar. 29, 2019. The disclosures of the prior applications are incorporated by reference herein in their entirety.

TECHNICAL FIELD

The present disclosure relates to a wireless communication system, and more particularly, to a method and apparatus for transmitting and receiving a signal in a wireless communication system supporting multi-transport block (TB) scheduling.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a signal in a wireless communication system supporting multi-transport block (TB) scheduling.

More particularly, an aspect of the present disclosure is to provide a method and apparatus for efficiently transmitting and receiving a downlink control channel or downlink control information in a wireless communication system supporting multi-TB scheduling.

It will be appreciated by persons skilled in the art that the objects that could be achieved with the present disclosure are not limited to what has been particularly described hereinabove and the above and other objects that the present disclosure could achieve will be more clearly understood from the following detailed description.

According to one aspect of the present disclosure, a method performed by a user equipment (UE) in a wireless communication system is provided. The method may include receiving downlink control information (DCI) for multiple transport block (TB) scheduling, the DCI including 1-bit information for a redundancy version (RV) or frequency hopping, based on a TB scheduled by the DCI being not repeated, determining an RV value related to the TB based on the 1-bit information, and based on the TB scheduled by the DCI being repeated two or more times, determining whether frequency hopping is applied to the TB based on the 1-bit information.

According to another aspect of the present disclosure, a UE configured to operate in a wireless communication system is provided. The UE may include a transceiver, and a processor configured to perform operations by controlling the transceiver. The operations may include receiving DCI for multiple TB scheduling, the DCI including 1-bit information for an RV or frequency hopping, based on a TB scheduled by the DCI being not repeated, determining an RV value related to the TB based on the 1-bit information, and based on the TB scheduled by the DCI being repeated two or more times, determining whether frequency hopping is applied to the TB based on the 1-bit information.

According to a third aspect of the present disclosure, A computer-readable storage medium storing instructions which, when executed by a processor, is configured to cause the processor to perform operations is provided. The operations may include receiving DCI for multiple TB scheduling, the DCI including 1-bit information for an RV or frequency hopping, based on a TB scheduled by the DCI being not repeated, determining an RV value related to the TB based on the 1-bit information, and based on the TB scheduled by the DCI being repeated two or more times, determining whether frequency hopping is applied to the TB based on the 1-bit information.

The method or the operations may further include, based on the TB scheduled by the DCI not being repeated, determining that frequency hopping is disabled for the TB.

The determination of an RV value related to the TB based on the 1-bit information may include determining one of an RV value of 0 and an RV value of 2 to be the RV value related to the TB based on the 1-bit information.

The method or the operations may include, based on the TB scheduled by the DCI being repeated two or more times, determining the RV value related to the TB to be a fixed value.

The method or the operations may include transmitting the TB on a physical uplink shared channel (PUSCH) based on the DCI.

The method or the operations may further include receiving the TB on a physical downlink shared channel (PUSCH) based on the DCI.

The UE may not be configured to use 64-quadrature amplitude modulation (64QAM) for the PDSCH.

The DCI may schedule up to 8 TBs.

According to the present disclosure, a signal may be efficiently transmitted and received in a wireless communication system supporting multi-transport block (TB) scheduling.

More particularly, a downlink control channel or downlink control information may be efficiently transmitted and received in a wireless communication system supporting multi-TB scheduling.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
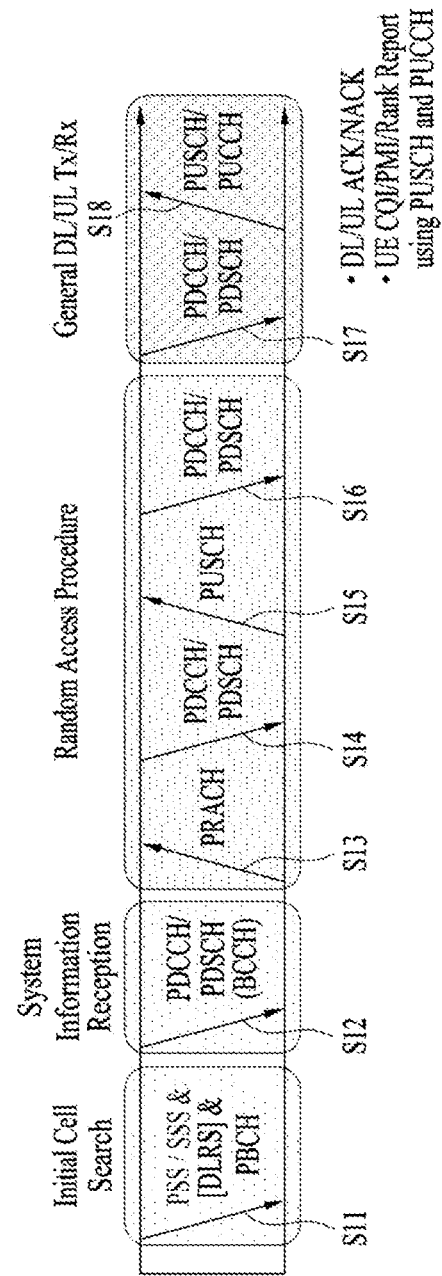
FIG. 1 is a diagram illustrating physical channels and a general signal transmission method using the physical channels in a 3rd generation partnership project (3GPP) system.

In the present disclosure, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) or 5G is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. 3GPP 5G refers the technology beyond TS 36.xxx Release 15 and the 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
    36.211: Physical channels and modulation
    36.212: Multiplexing and channel coding
    36.213: Physical layer procedures
    36.300: Overall description
    36.304: User Equipment (UE) procedures in idle mode
    36.331: Radio Resource Control (RRC)

3GPP NR
    38.211: Physical channels and modulation
    38.212: Multiplexing and channel coding
    38.213: Physical layer procedures for control
    38.214: Physical layer procedures for data
    38.300: NR and NG-RAN Overall Description
    38.304: User Equipment (UE) procedures in Idle mode and RRC Inactive state
    36.331: Radio Resource Control (RRC) protocol specification Evolved UMTS terrestrial radio access network (E-UTRAN), LTE, LTE-A, LTE-A pro, and 5th generation (5G) systems may be generically called an LTE system. A next generation radio access network (NG-RAN) may be referred to as an NR system. A UE may be fixed or mobile. The term UE is interchangeably used with other terms such as terminal, mobile station (MS), user terminal (UT), subscriber station (SS), mobile terminal (MT), and wireless device. A BS is generally a fixed station communicating with a UE. The term BS is interchangeably used with other terms such as evolved Node B (eNB), general Node B (gNB), base transceiver system (BTS), and access point (AP).

A. Physical Channels and Frame Structures

Physical Channels and General Signal Transmission

FIG. 1 is a diagram illustrating physical channels and a general signal transmission procedure in a 3GPP system. In a wireless communication system, a UE receives information from a BS on DL and transmits information to the BS on UL. The information transmitted and received between the UE and the BS includes data and various types of control information. There are many physical channels according to the types/uses of information transmitted and received between BS and the UE.

When a UE is powered on or enters a new cell, the UE performs initial cell search including acquisition of synchronization with a BS (S11). For the initial cell search, the UE synchronizes its timing with the BS and acquires information such as a cell identifier (ID) by receiving a primary synchronization signal (PSS) and a secondary synchronization signal (SSS) from the BS. The UE may further acquire information broadcast in the cell by receiving a physical broadcast channel (PBCH) from the BS. During the initial cell search, the UE may further monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) corresponding to the PDCCH (S12).

Subsequently, to complete the connection to the BS, the UE may perform a random access procedure (see FIG. 2 and a related description) with the BS (S13 to S16). Specifically, the UE may transmit a random access preamble on a physical random access channel (PRACH) (S13) and may receive a PDCCH and a random access response (RAR) to the preamble on a PDSCH corresponding to the PDCCH (S14). The UE may then transmit a physical uplink shared channel (PUSCH) by using scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a physical uplink control channel (PUCCH) to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), a rank indication (RI), and so on. In general, UCI is transmitted on the PUCCH. However, if control information and data should be transmitted simultaneously, the control information may be transmitted on the PUSCH. In addition, the UE may transmit the UCI aperiodically on the PUSCH, upon receipt of a request/command from a network.

Figure 2:
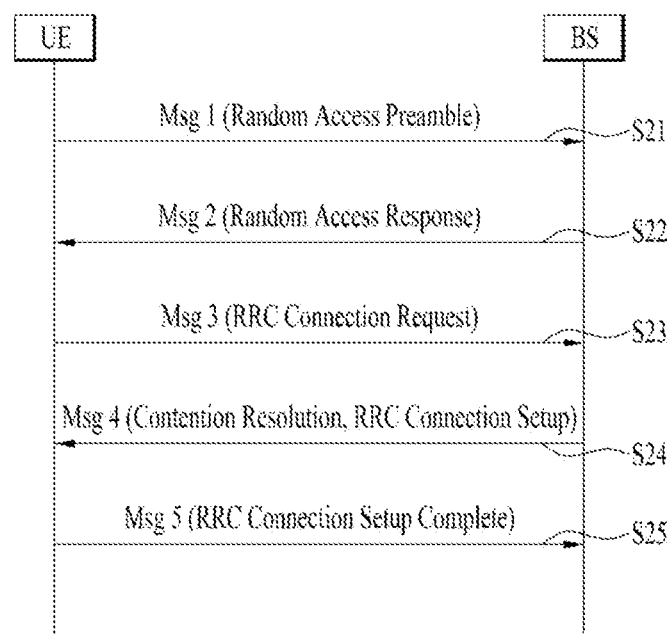
FIG. 2 is a diagram illustrating a random access procedure.

FIG. 2 is a diagram illustrating a random access procedure.

The random access procedure is performed during initial access in RRC idle mode (or RRC IDLE state), during initial access after radio link failure (RLF), during handover requiring the random access procedure, or upon generation of UL/DL data requiring the random access procedure in RRC connected mode (or RRC_CONNECTED state). The random access procedure may also be referred to as a random access channel (RACH) procedure. Some RRC messages such as an RRC Connection Request message, a Cell Update message, and a URA Update message are also transmitted in the random access procedure. Logical channels, common control channel (CCCH), dedicated control channel (DCCH), and dedicated traffic channel (DTCH) may be mapped to a transport channel RACH. The transport channel RACH is mapped to a physical channel PRACH. When the medium access control (MAC) layer of a UE indicates PRACH transmission to the physical layer of the UE, the physical layer of the UE selects one access slot and one signature and transmits a PRACH preamble on UL. The random access procedure is contention-based or contention-free.

Referring to FIG. 2, a UE receives random access information in system information from a BS and stores the random access information. Subsequently, when random access is required, the UE transmits a random access preamble (message 1 or Msg1) to the BS (S21). The random access preamble may also be referred to as an RACH preamble or a PRACH preamble. Upon receipt of the random access preamble from the UE, the BS transmits an RAR (message 2 or Msg2) to the UE (S17). Specifically, DL scheduling information for the RAR may be cyclic redundancy check (CRC)-masked with a random access RNTI (RA-RNTI) and transmitted on an L1/L2 control channel (PDCCH). Upon receipt of the DL scheduling signal masked with the RA-RNTI, the UE may receive the RAR on a PDSCH and decode the RAR. The UE then checks whether the RAR includes RAR information directed to the UE. The UE may determine whether the RAR includes the random access preamble ID (RAID) of the transmitted preamble to check whether the RAR includes RAR information directed to the UE. The RAR includes a timing advance (TA) which is timing offset information for synchronization, radio resource allocation information for UL, and a temporary ID (e.g., temporary cell RNTI (C-RNTI)) for UE identification. Upon receipt of the RAR, the UE performs a UL transmission (message 3 or Msg3) including an RRC Connection Request message on a UL shared channel according to the radio resource allocation information included in the RAR (S18). After receiving the UL transmission from the UE, the BS transmits a message for contention resolution (message 4 or Msg4) to the UE (S24). The message for contention resolution may be referred to as a contention resolution message and include an RRC Connection Setup message. After receiving the contention resolution message from the BS, the UE completes the connection setup and then transmits a Connection Setup Complete message (message 5 or Msg5) to the BS (S25).

In a contention-free random access (CFRA) procedure, before the UE transmits the random access preamble (S21), the BS may allocate a contention-free random access preamble to the UE. The contention-free random access preamble may be allocated by a handover command or dedicated signaling such as a PDCCH. When the contention-free random access preamble is allocated to the UE, the UE may transmit the allocated contention-free random access preamble to the BS in a similar manner to in step S21. Upon receipt of the contention-free random access preamble from the UE, the BS may transmit an RAR to the UE in a similar manner to in step S17.

Radio Frame Structures

Figure 3:
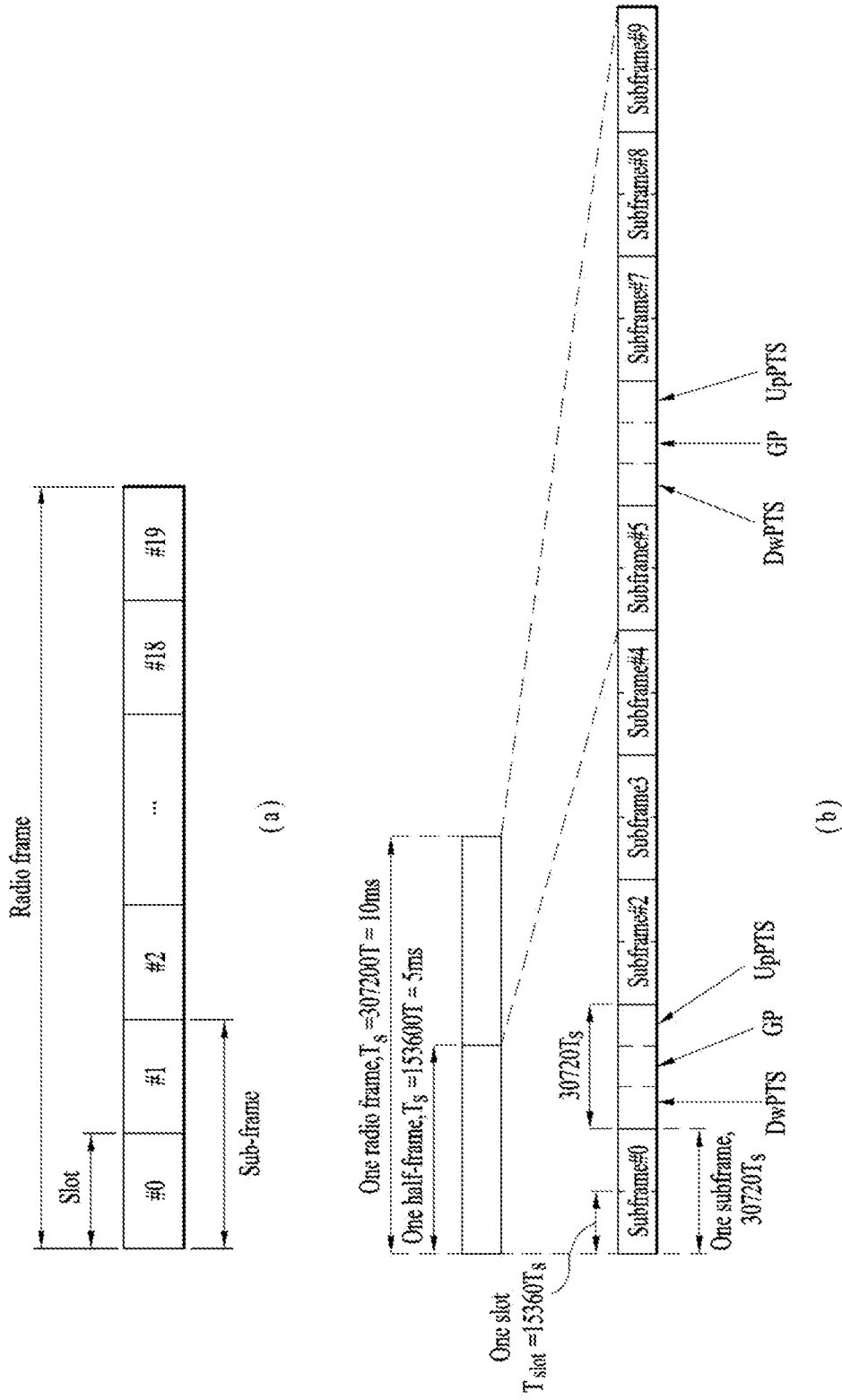
FIG. 3 is a diagram illustrating a long term evolution (LTE) frame structure.

FIG. 3 illustrates LTE radio frame structures. LTE supports frame type 1 for frequency division duplex (FDD), frame type 2 for time division duplex (TDD), and frame type 3 for an unlicensed cell (UCell). Up to 31 secondary cells (SCells) may be aggregated in addition to a primary cell (PCell). Unless otherwise specified, operations described in the disclosure may be applied independently on a cell basis. In multi-cell aggregation, different frame structures may be used for different cells. Further, time resources (e.g., a subframe, a slot, and a subslot) within a frame structure may be generically referred to as a time unit (TU).

FIG. 3(a) illustrates frame type 1. A DL radio frame is defined by 10 1-ms subframes (SFs). A subframe includes 14 or 12 symbols according to a cyclic prefix (CP). In a normal CP case, a subframe includes 14 symbols, and in an extended CP case, a subframe includes 12 symbols. Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

FIG. 3(b) illustrates frame type 2. Frame type 2 includes two half frames. A half frame includes 4 (or 5) general subframes and 1 (or 0) special subframe. According to a UL-DL configuration, a general subframe is used for UL or DL. A subframe includes two slots.

The above-described radio frame structures are merely exemplary, and the number of subframes in a radio frame, the number of slots in a subframe, and the number of symbols in a slot may vary.

Figure 4:
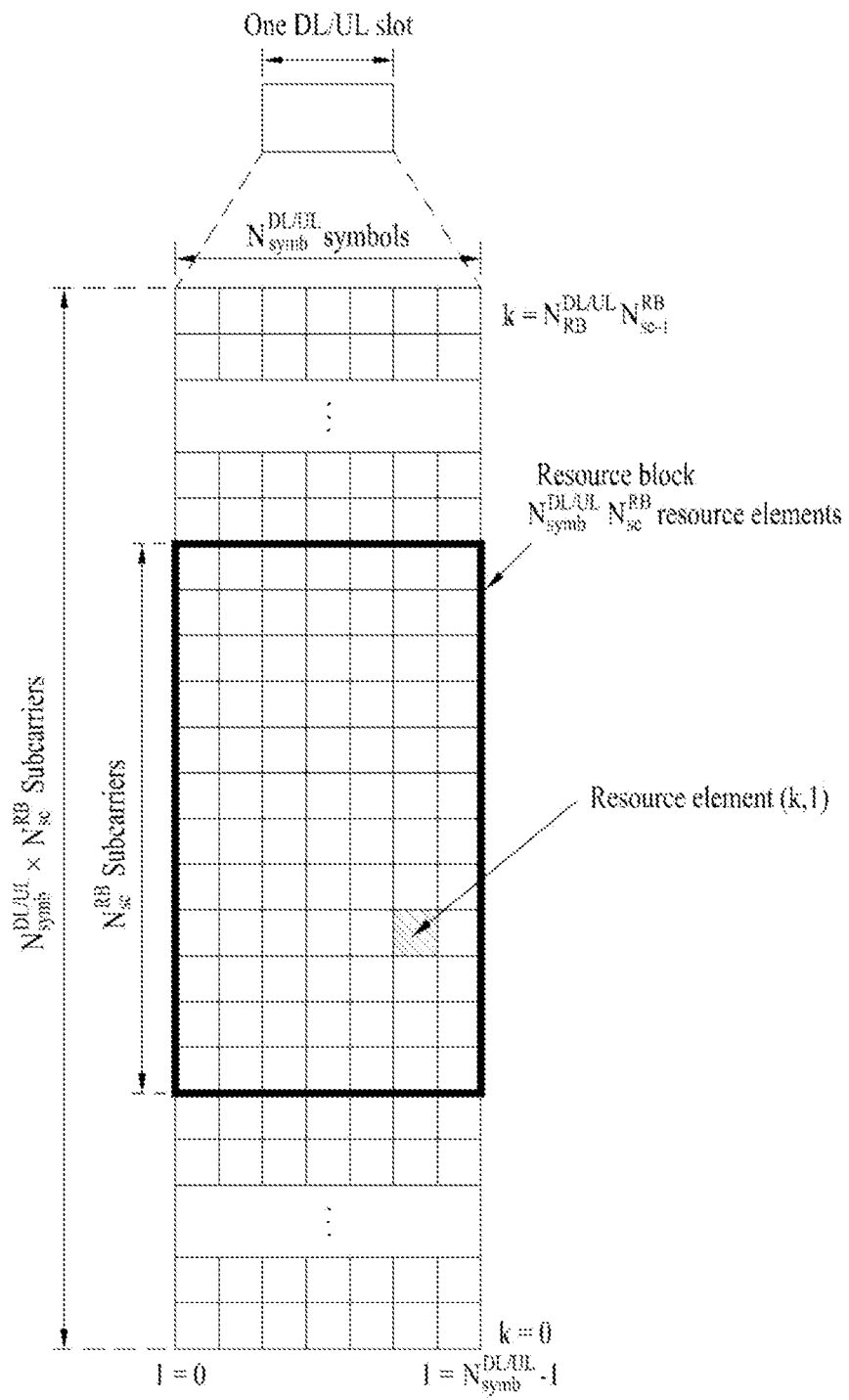
FIG. 4 is a diagram illustrating a slot structure of an LTE frame.

FIG. 4 is a diagram illustrating a slot structure in an LTE frame.

Referring to FIG. 4, a slot includes a plurality of symbols in the time domain by a plurality of resource blocks (RBs) in the frequency domain. A symbol may refer to a symbol duration. A slot structure may be represented as a resource grid including $N^{DL/UL}_{RB} \times N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to a subcarrier spacing (SCS) and a CP length. For example, one slot includes 7 symbols in the normal CP case, whereas one slot includes 6 symbols in the extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource including one symbol by one subcarrier is referred to as a resource element (RE) or tone. Each RE of a resource grid may be uniquely identified by an index pair (k, 1) in a slot where k is a frequency-domain index ranging from 0 to $N^{DL/UL}_{RB} \times N^{RB}_{sc} - 1$ and 1 is a time-domain index ranging from 0 to $N^{DL/UL}_{symb} - 1$.

Figure 5:
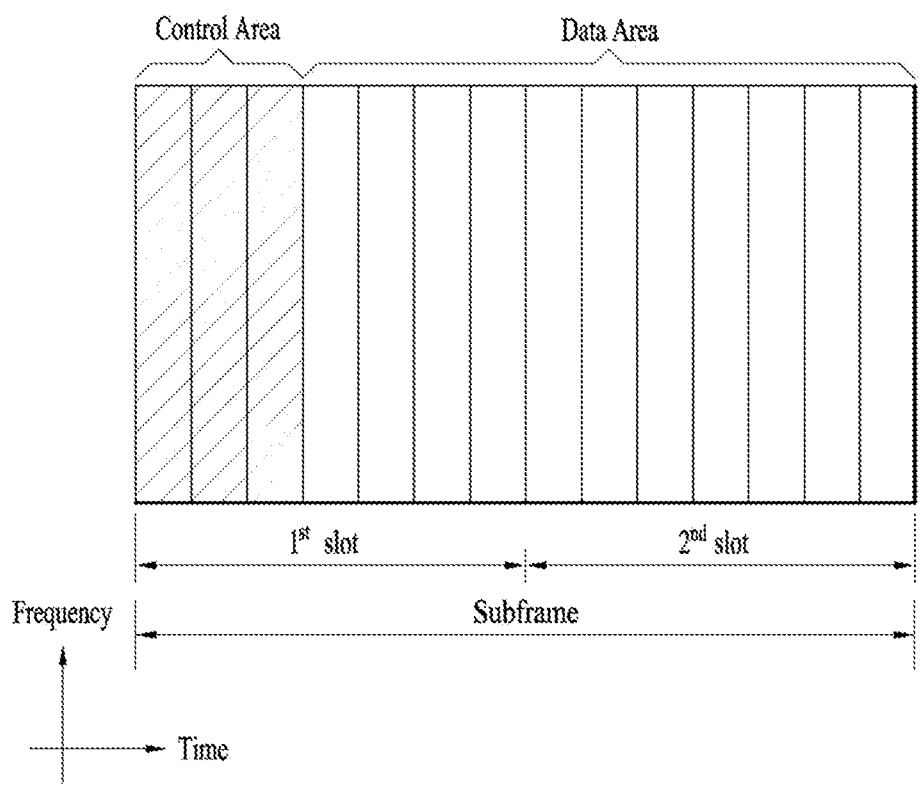
FIG. 5 is a diagram illustrating a downlink (DL) subframe structure in an LTE system.

FIG. 5 illustrates a DL frame structure used in an LTE system.

Referring to FIG. 5, up to three (or four) OFDM(A) symbols at the beginning of the first slot of a subframe correspond to a control region. The remaining OFDM(A) symbols correspond to a data region in which a PDSCH is allocated, and a basic resource unit of the data region is an RB. DL control channels include physical control format indicator channel (PCFICH), PDCCH, physical hybrid-ARQ indicator channel (PHICH), and so on. The PCFICH is transmitted in the first OFDM symbol of a subframe, conveying information about the number of OFDM symbols used for transmission of control channels in the subframe. The PHICH is a response to a UL transmission, conveying an HARQ ACK/NACK signal. Control information delivered on the PDCCH is called downlink control information (DCI). The DCI includes UL resource allocation information, DL resource control information, or a UL transmit power control command for any UE group.

Figure 6:
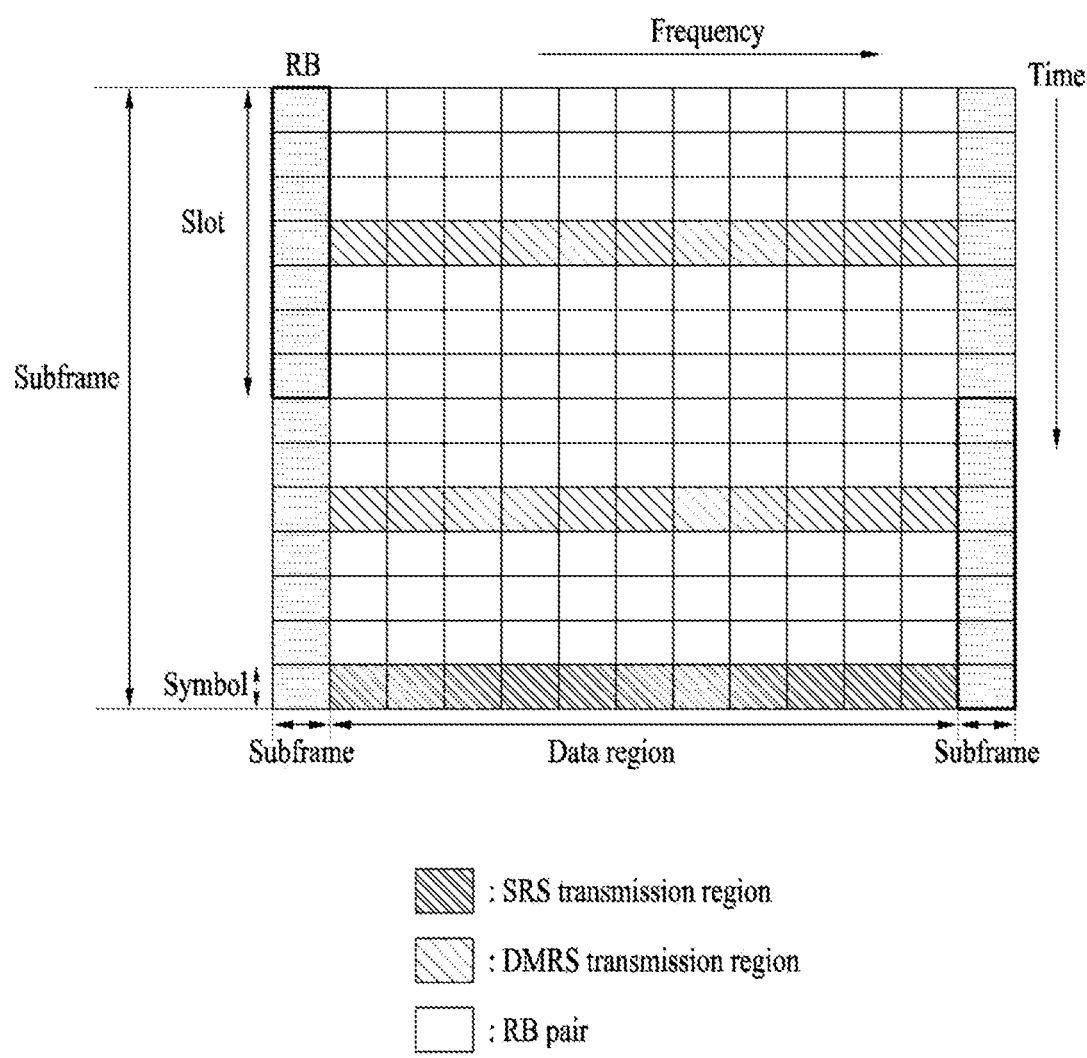
FIG. 6 is a diagram illustrating an uplink (UL) subframe structure in LTE.

FIG. 6 illustrates a UL frame structure used in the LTE system.

Referring to FIG. 6, a subframe includes two 0.5-ms slots. Each slot includes a plurality of symbols, each corresponding to one SC-FDMA symbol. An RB is a resource allocation unit corresponding to 12 subcarriers in the frequency domain by one slot in the time domain. An LTE UL subframe is divided largely into a control region and a data region. The data region is communication resources used for each UE to transmit data such as voice, packets, and so on, including a PUSCH. The control region is communication resources used for each UE to transmit a DL channel quality report, an ACK/NACK for a DL signal, a UL scheduling request, and so on, including a PUCCH. A sounding reference signal (SRS) is transmitted in the last SC-FDMA symbol of a subframe in the time domain.

Figure 7:
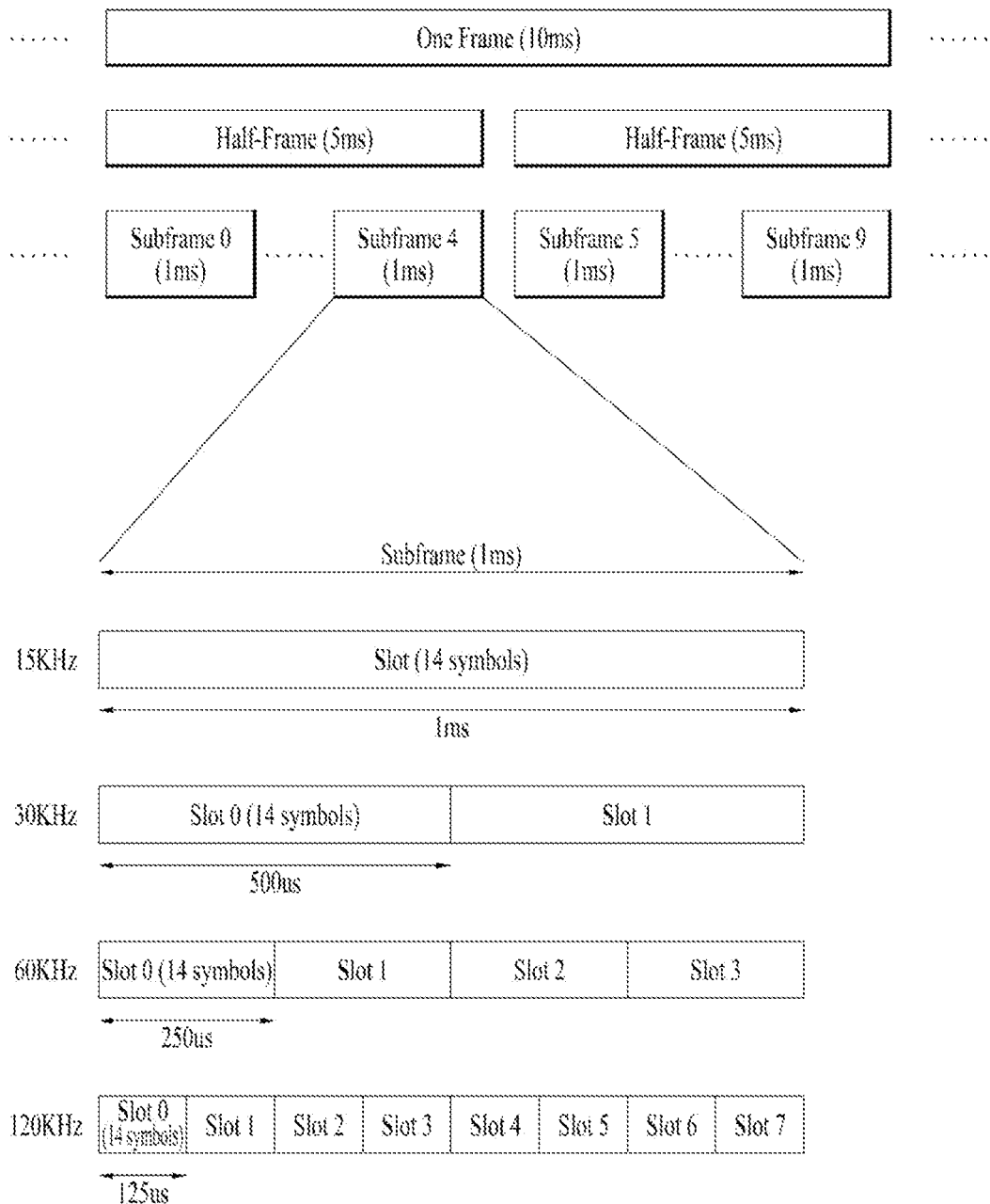
FIG. 7 is a diagram illustrating a frame structure in a new RAT (NR) system.

FIG. 7 illustrates a radio frame structure used in an NR system.

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on an SCS. Each slot includes 12 or 14 OFDM(A) symbols according to a CP. When a normal CP is used, each slot includes 14 OFDM symbols. When an extended CP is used, each slot includes 12 OFDM symbols. A symbol may include an OFDM symbol (CP-OFDM symbol) and an SC-FDMA symbol (or DFT-s-OFDM symbol).

Table 1 exemplarily illustrates that the number of symbols per slot, the number of slots per frame, and the number of slots per subframe vary according to SCSs in the normal CP case.

TABLE 1

| SCS ($15 \times 2^\mu$) | $N^{slot}_{symb}$ | $N^{frame, \mu}_{slot}$ | $N^{subframe, \mu}_{slot}$ |
|---|---|---|---|
| 15 KHz ($\mu = 0$) | 14 | 10 | 1 |
| 30 KHz ($\mu = 1$) | 14 | 20 | 2 |
| 60 KHz ($\mu = 2$) | 14 | 40 | 4 |
| 120 KHz ($\mu = 3$) | 14 | 80 | 8 |
| 240 KHz ($\mu = 4$) | 14 | 160 | 16 |

* $N^{slot}_{symb}$: number of symbols in a slot
* $N^{frame, \mu}_{slot}$: number of slots in a frame
* $N^{subframe, \mu}_{slot}$: number of slots in a subframe Table 2 illustrates that the number of symbols per slot, the number of slots per frame, and the number of slots per subframe vary according to SCSs in the extended CP case.

TABLE 2

| SCS ($15 \times 2^\mu$) | $N^{slot}_{symb}$ | $N^{frame, \mu}_{slot}$ | $N^{subframe, \mu}_{slot}$ |
|---|---|---|---|
| 60 KHz ($\mu = 2$) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a TU) including the same number of symbols may be configured differently for the aggregated cells.

Figure 8:
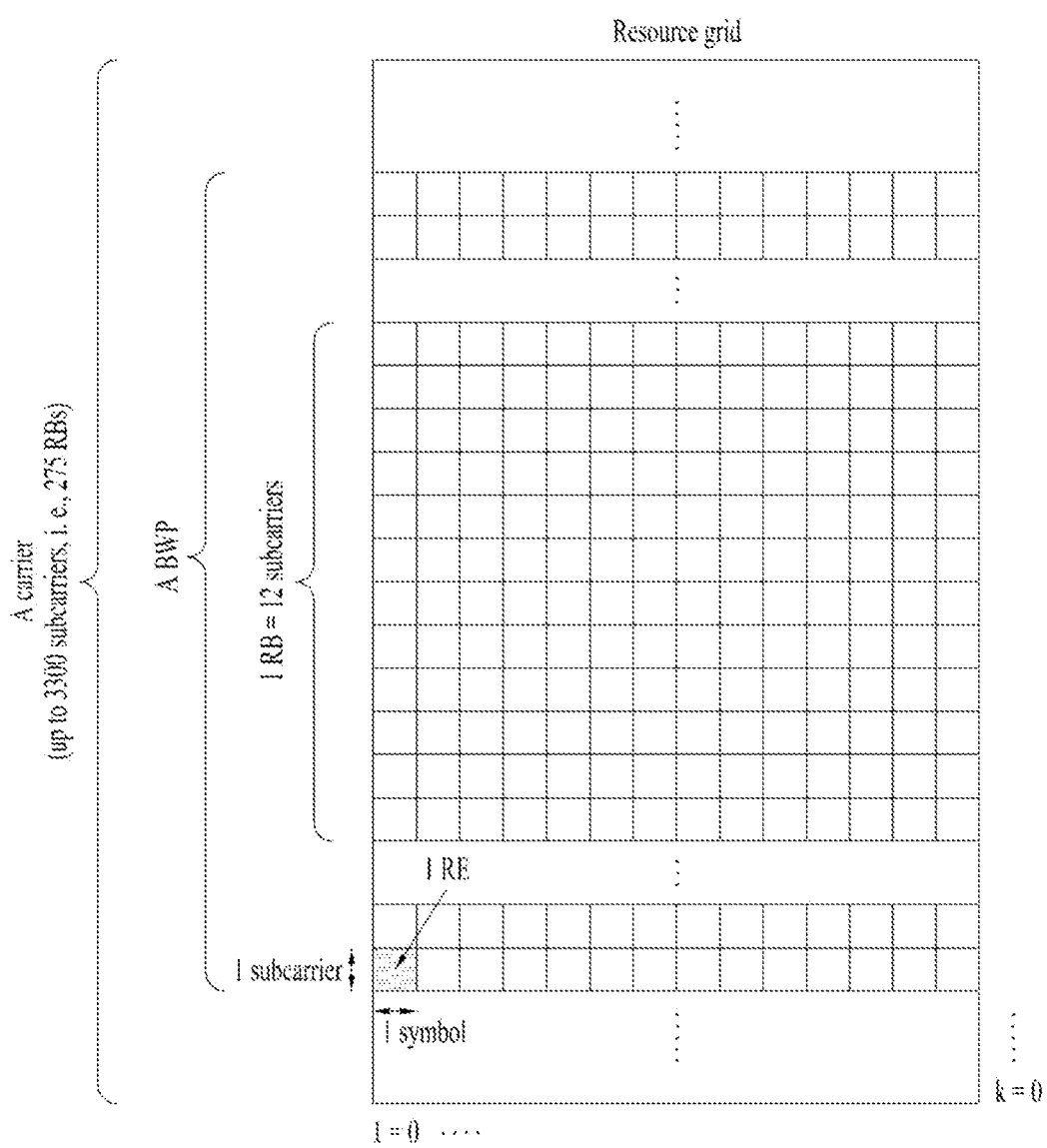
FIG. 8 is a diagram illustrating a slot structure of an NR frame.

FIG. 8 illustrates a slot structure of an NR frame.

A slot includes a plurality of symbols in the time domain. For example, one slot includes 14 symbols in the normal CP case and 12 symbols in the extended CP case. A carrier includes a plurality of subcarriers in the frequency domain. An RB may be defined by a plurality of (e.g., 12) consecutive subcarriers in the frequency domain. A bandwidth part (BWP) may be defined by a plurality of consecutive (P)RBs in the frequency domain and correspond to one numerology (e.g., SCS, CP length, and so on). A carrier may include up to N (e.g., 5) BWPs. Data communication may be conducted in an active BWP, and only one BWP may be activated for one UE. Each element of a resource grid may be referred to as an RE, to which one complex symbol may be mapped.

B. UL and DL Channels

DL Channels

A BS transmits related signals on DL channels to a UE, and the UE receives the related signals on the DL channels from the BS.

(1) Physical Downlink Shared Channel (PDSCH)

The PDSCH delivers DL data (e.g., a DL shared channel transport block (DL-SCH TB)) and adopts a modulation scheme such as quadrature phase shift keying (QPSK), 16-ary quadrature amplitude modulation (16 QAM), 64-QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a demodulation reference signal (DMRS) to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

The UE acquires DCI delivered on the PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in a CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 3 lists exemplary features of each search space type.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(S) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

UL Channels

A UE transmits related signals on UL channels to a BS, and the BS receives the related signals on the UL channels from the UE.

(1) Physical Uplink Shared Channel (PUSCH)

The PUSCH delivers UL data (e.g., UL shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be scheduled dynamically by a UL grant in DCI, or semi-statically by higher-layer signaling (e.g., RRC signaling) (and/or layer 1 (L1) signaling such as a PDCCH) (configured grant). The PUSCH transmission may be performed in a codebook-based or non-codebook-based manner.

(2) Physical Uplink Control Channel (PUCCH)

The PUCCH delivers UCI, an HARQ ACK, and/or an SR and is classified as a short PUCCH or a long PUCCH according to the transmission duration of the PUCCH. Table 5 lists exemplary PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

C. Machine Type Communication (MTC)

MTC, which is a type of data communication involving one or more machines, may be applied to machine-to-machine (M2M) or Internet of things (IoT). A machine refers to an entity that does not require direct human manipulation or intervention. For example, machines include a smart meter equipped with a mobile communication module, a vending machine, a portable terminal having an MTC function, and so on. For example, services such as meter reading, water level measurement, use of surveillance cameras, and inventory reporting of vending machines may be provided through MTC. MTC has the features of a small amount of transmission data and intermittent UL/DL data transmissions/receptions. Therefore, it is efficient to lower the unit cost of MTC devices and reduce battery consumption in correspondence with low data rates. An MTC device generally has low mobility, and thus MTC is conducted in a channel environment which hardly changes.

The 3GPP has applied MTC since release 10, and MTC may be implemented to satisfy the requirements of low cost and low complexity, coverage enhancement, and low power consumption. For example, 3GPP Release 12 added features for low-cost MTC devices and thus defined UE category 0. A UE category is an indicator indicating the amount of data that a UE may process in a communication modem. A UE of UE category 0 may reduce baseband/radio frequency (RF) complexity by using a reduced peak data rate, a half-duplex operation with relaxed RF requirements, and a single reception (Rx) antenna. In 3GPP Release 12, enhanced MTC (eMTC) was introduced, and the price and power consumption of MTC UEs were further lowered by operating the MTC UEs only at 1.08 MHz (that is, 6 RBs), a minimum frequency bandwidth supported in legacy LTE.

In the following description, the term MTC is interchangeably used with the terms eMTC, LTE-M1/M2, bandwidth reduced low complexity/coverage enhanced (BL/CE), non-BL UE (in enhanced coverage), NR MTC, and enhanced BL/CE, and other equivalent terms. An MTC UE/device covers any terminal/device with MTC functionality (e.g., a smart meter, a vending machine, and a portable terminal with an MTC function).

Figure 9:
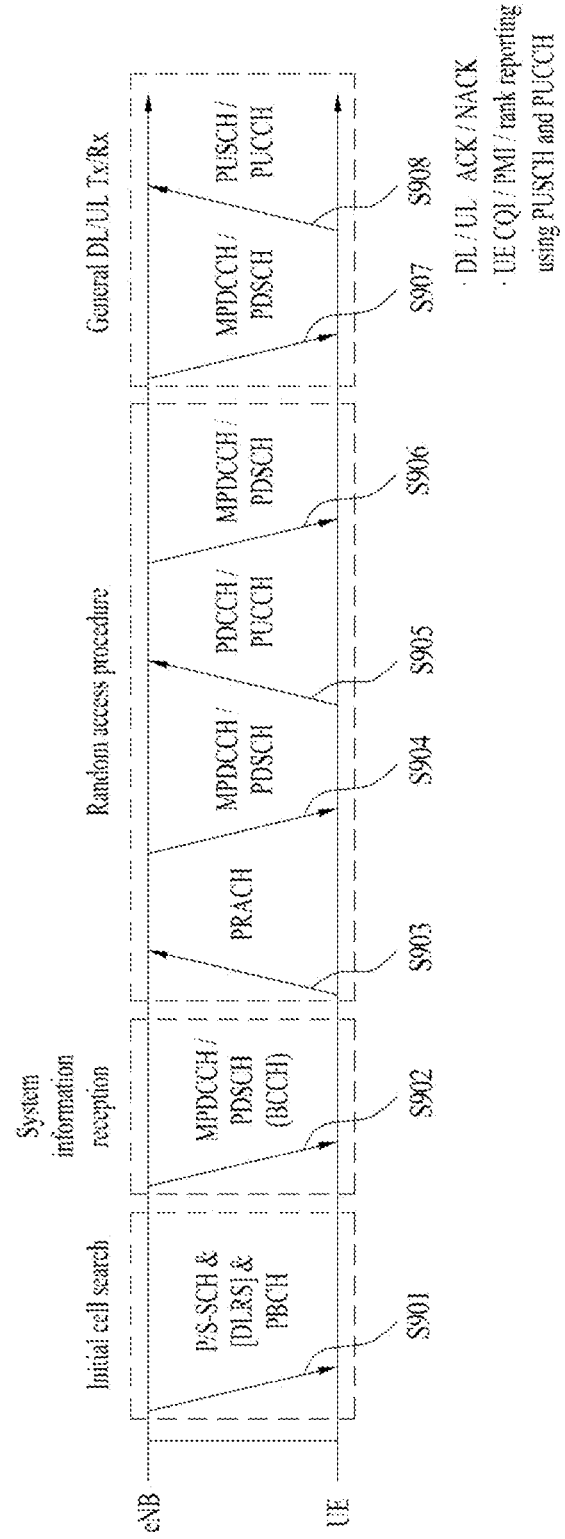
FIG. 9 is a diagram illustrating physical channels and a general signal transmission method using the physical channels in machine type communication (MTC)

FIG. 9 illustrates physical channels and a general signal transmission using the physical channels in MTC. In a wireless communication system, an MTC UE receives information on a DL from a BS and transmits information on a UL to the BS. Information transmitted and received between the BS and the UE includes data and various types of control information, and various physical channels are defined according to the types/usages of information carried on the physical channels.

When a UE is powered on or enters a new cell, the UE performs initial cell search including acquisition of synchronization with a BS (S901). For the initial cell search, the UE synchronizes its timing with the BS and acquires information such as a cell ID by receiving a PSS and an SSS from the BS. The PSS/SSS may be the PSS/SSS of legacy LTE. The UE may then acquire information broadcast in the cell by receiving a PBCH from the BS (S902). During the initial cell search, the UE may further monitor a DL channel state by receiving a DL RS.

After the initial cell search, the UE may acquire more detailed system information by receiving a MTC PDCCH (MPDCCH) and receiving a PDSCH corresponding to the MPDCCH (S902).

Subsequently, to complete the connection to the BS, the UE may perform a random access procedure with the BS (S903 to S906). Specifically, the UE may transmit a random access preamble on a PRACH (S903) and may receive a PDCCH and an RAR to the preamble on a PDSCH corresponding to the PDCCH (S904). The UE may then transmit a PUSCH by using scheduling information included in the RAR (S905), and perform a contention resolution procedure including reception of a PDCCH and a PDSCH corresponding to the PDCCH (S906).

After the above procedure, the UE may receive an MPDCCH signal and/or a PDSCH signal from the BS (S907) and transmit a PUSCH signal and/or a PUCCH signal to the BS (S908) in a general UL/DL signal transmission procedure. Control information that the UE transmits to the BS is generically called UCI. The UCI includes an HARQ ACK/NACK, an SR, and CSI. The CSI includes a CQI, a PMI, an RI, and so on.

Figure 10:
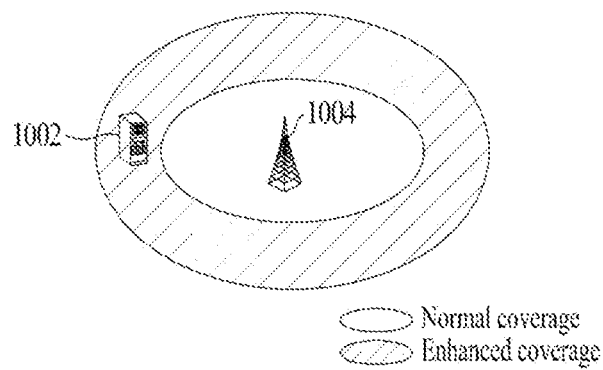
FIG. 10 is a diagram illustrating cell coverage enhancement in MTC.
Figure 10:
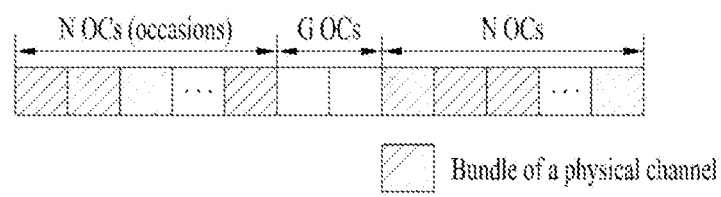

FIG. 10 illustrates cell coverage enhancement in MTC. Coverage enhancement may also be expressed as coverage extension, and a technique for coverage enhancement described in relation to MTC may be applied to NB-IoT and 5G (or NR) in the same/similar manner.

For cell extension or cell enhancement (CE) of a BS 1004 to an MTC device 1002, various CE techniques are under discussion. For example, for CE, the BS/UE may transmit/receive one physical channel/signal in a plurality of occasions (a bundle of physical channels). The physical channel/signal may be repeatedly transmitted/received according to a predefined rule during a bundle interval. A receiver may increase the decoding success rate of the physical channel/signal by decoding some or all of the physical channel/signal bundle. An occasion may mean resources (e.g., time/frequency) in which a physical channel/signal may be transmitted/received. An occasion for a physical channel/signal may include a subframe, a slot, or a symbol set in the time domain. The symbol set may include one or more consecutive OFDM-based symbols. An OFDM-based symbol may include an OFDM(A) symbol and a DFT-s-OFDM(A) (i.e., SC-FDM(A)) symbol. The occasion for a physical channel/signal may include a frequency band or an RB set in the frequency domain. For example, a PBCH, a PRACH, an MTC PDCCH (MPDCCH), a PDSCH, a PUCCH, and a PUSCH may be repeatedly transmitted/received.

MTC supports an operation mode for CE, and a mode supporting repeated transmissions/receptions of a signal for CE may be referred to as a CE mode. The number of repeated transmissions/receptions of a signal for CE may be referred to as a CE level. Table 6 illustrates exemplary CE modes/levels supported in MTC.

TABLE 6

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

A first mode (e.g., CE Mode A) is defined for small CE, supporting full mobility and CSI feedback, in which no repetition or a small number of repetitions are performed. A first-mode operation may be identical to the operation range of UE category 1. A second mode (e.g., CE Mode B) is defined for UEs in an extremely poor coverage condition, supporting CSI feedback and limited mobility, in which a large number of repeated transmissions are defined. The second mode provides up to 15 dB of CE with respect to the range of UE category 1. Each level of MTC is defined differently for a random access procedure (or RACH procedure) and a paging procedure.

Figure 11:
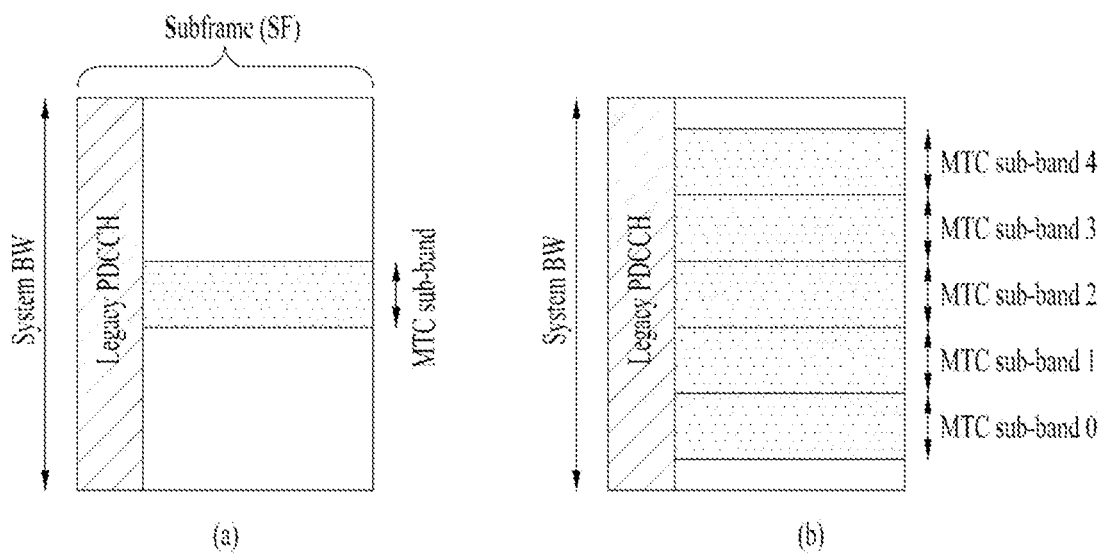
FIG. 11 is a diagram illustrating MTC signal bands.

FIG. 11 illustrates MTC signal bands.

Referring to FIG. 11, to reduce the unit cost of MTC UEs, MTC may be conducted only in a specific band (or channel band) (MTC subband or narrowband (NB)) of the system bandwidth of a cell, regardless of the system bandwidth of the cell. For example, an MTC UE may perform a UL/DL operation only in a 1.08-MHz frequency band. 1.08 MHz corresponds to six consecutive PRBs in the LTE system, and is defined to enable MTC UEs to follow the same cell search and random access procedures as LTE UEs. FIG. 11(a) illustrates an MTC subband configured at the center of a cell (e.g., center 6 PRBs), and FIG. 11(b) illustrates a plurality of MTC subbands configured within a cell. The plurality of MTC subbands may be configured contiguously/non-contiguously in the frequency domain. Physical channels/signals for MTC may be transmitted and received in one MTC subband. In the NR system, an MTC subband may be defined in consideration of a frequency range and an SCS. In the NR system, for example, an MTC subband may be defined as X consecutive PRBs (i.e., 0.18*X*(2^µ) MHz bandwidth) (see Table 1 for µ). X may be set to 20 according to the size of a synchronization signal/physical broadcast channel (SS/PBCH) block. In the NR system, MTC may operate in at least one BWP. A plurality of MTC subbands may be configured in a BWP.

Figure 12:
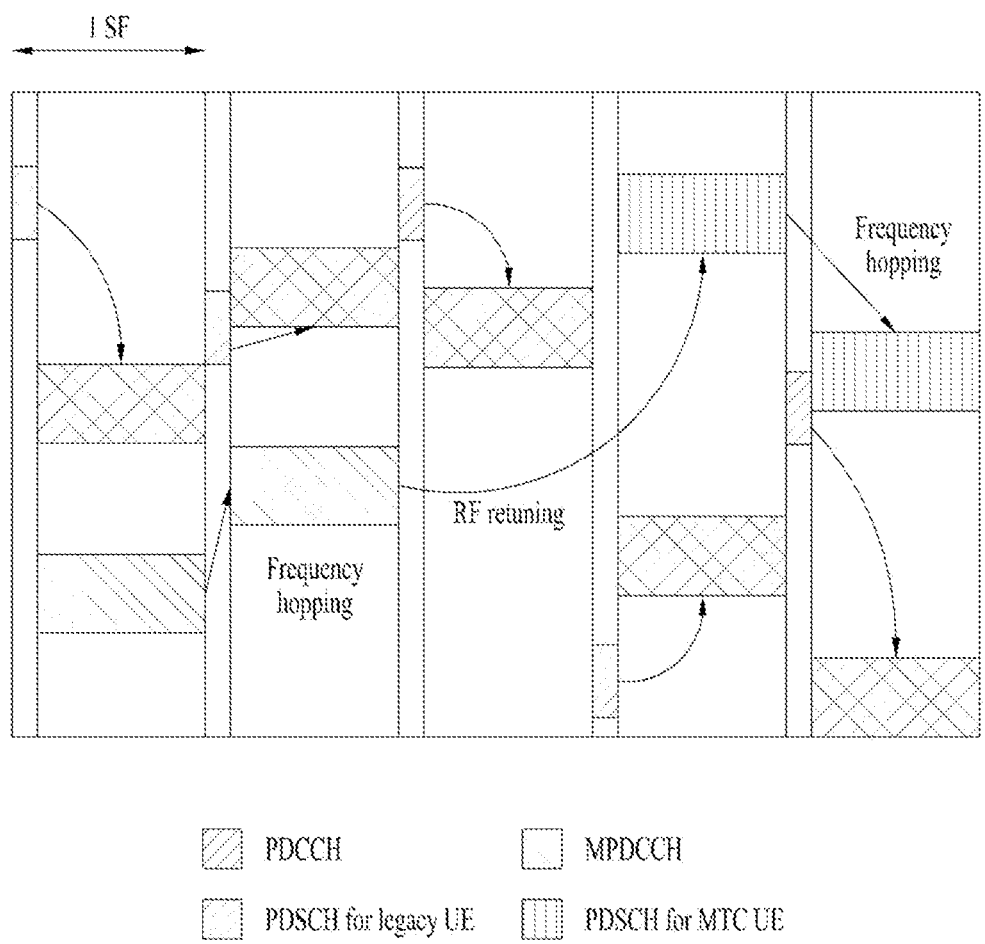
FIG. 12 is a diagram illustrating scheduling in legacy LTE and MTC.

FIG. 12 illustrates scheduling in legacy LTE and MTC.

Referring to FIG. 12, a PDSCH is scheduled by a PDCCH in legacy LTE. Specifically, the PDCCH may be transmitted in the first N OFDM symbols in a subframe (N=1 to 3), and the PDSCH scheduled by the PDCCH is transmitted in the same subframe. In MTC, a PDSCH is scheduled by an MPDCCH. Accordingly, an MTC UE may monitor MPDCCH candidates in a search space within a subframe. The monitoring includes blind decoding of the MPDCCH candidates. The MPDCCH delivers DCI, and the DCI includes UL or DL scheduling information. The MPDCCH is multiplexed with the PDSCH in FDM in a subframe. The MPDCCH is repeatedly transmitted in up to 256 subframes, and the DCI carried in the MPDCCH includes information about an MPDCCH repetition number. In DL scheduling, when the repeated transmissions of the MPDCCH end in subframe #N, transmission of the PDSCH scheduled by the MPDCCH starts in subframe #N+2. The PDSCH may be repeatedly transmitted in up to 2048 subframes. The MPDCCH and the PDSCH may be transmitted in different MTC subbands. In UL scheduling, when the repeated transmissions of the MPDCCH end in subframe #N, transmission of a PUSCH scheduled by the MPDCCH starts in subframe #N+4. For example, when the PDSCH is repeatedly transmitted in 32 subframes, the PDSCH may be transmitted in the first 16 subframes in a first MTC subband, and in the remaining 16 subframes in a second MTC subband. MTC operates in a half-duplex mode. MTC HARQ retransmission is adaptive and asynchronous.

D. NB-IoT (Narrowband Internet of Things)

NB-IoT is a narrowband Internet of things technology supporting a low-power wide area network through an existing wireless communication system (e.g., LTE or NR). Further, NB-IoT may refer to a system supporting low complexity and low power consumption in a narrowband (NB). Since an NB-IoT system uses the same OFDM parameters as those of an existing system, such as an SCS, there is no need to allocate an additional band separately for the NB-IoT system. For example, one PRB of an existing system band may be allocated for NB-IoT. Considering that an NB-IoT UE perceives a single PRB as a carrier, PRB and carrier may be interpreted as the same meaning in the description of NB-IoT.

NB-IoT may operate in a multi-carrier mode. In NB-IoT, a carrier may be defined as an anchor type carrier (i.e., anchor carrier or anchor PRB) or a non-anchor type carrier (i.e., non-anchor carrier or non-anchor PRB). From the perspective of a BS, the anchor carrier may mean a carrier carrying a narrowband PSS (NPSS), a narrowband SSS (NSSS), and a narrowband PBCH (NPBCH) for initial access, and a narrowband PDSCH (NPDSCH) for a narrowband system information block (N-SIB). That is, in NB-IoT, a carrier for initial access may be referred to as an anchor carrier, and the other carrier(s) may be referred to as non-anchor carrier(s). One or more anchor carriers may exist in the system.

While NB-IoT is described mainly in the context of being applied to the legacy LTE system in the present disclosure, the description may be extended to a next-generation system (e.g., NR system). In the present disclosure, the description of NB-IoT may be extended to MTC serving a similar technical purpose (e.g., low-power, low-cost, and CE). The term NB-IoT may be replaced with other equivalent terms such as NB-LTE, NB-IoT enhancement, enhanced NB-IoT, further enhanced NB-IoT, and NB-NR.

Figure 13:
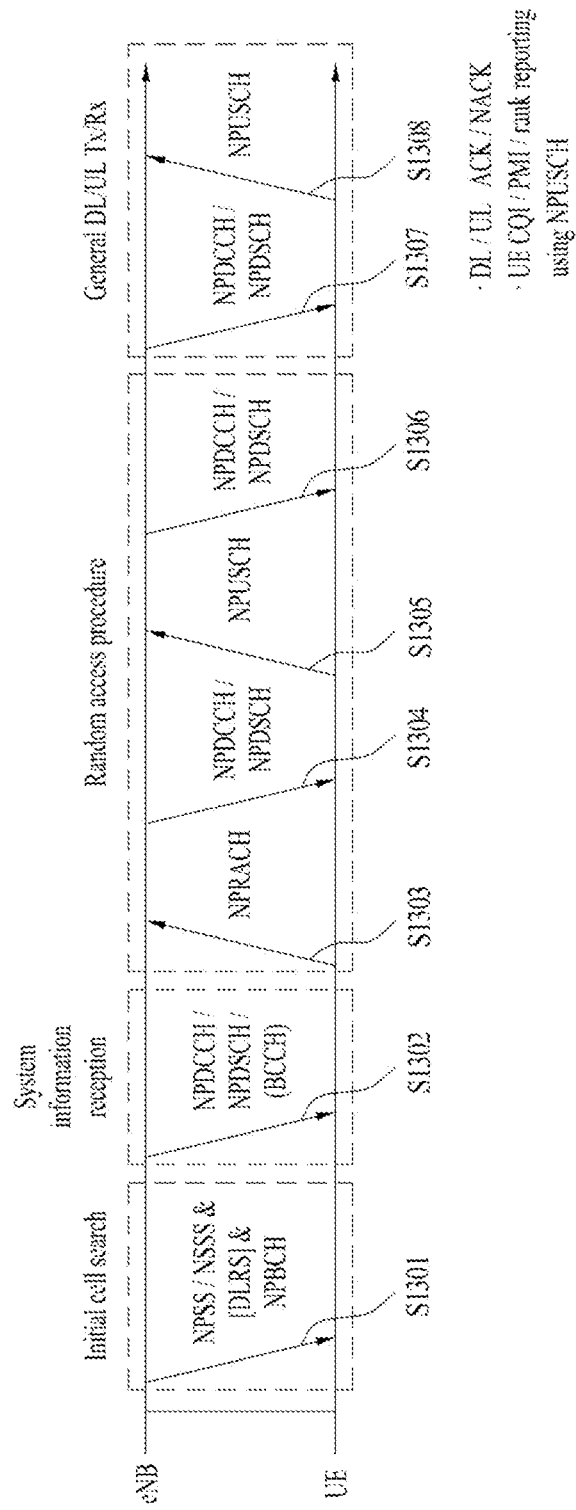
FIG. 13 is a diagram illustrating physical channels and a general signal transmission method using the physical channels in narrowband-Internet of things (NB-IoT)

FIG. 13 illustrates physical channels and a general signal transmission using the physical channels in NB-IoT. In a wireless communication system, a UE receives information on a DL from a BS and transmits information on a UL to the BS. Information transmitted and received between the BS and the UE includes data and various types of control information, and various physical channels are defined according to the types/usages of information carried on the physical channels.

When a UE is powered on or enters a new cell, the UE performs initial cell search including acquisition of synchronization with a BS (S1301). For the initial cell search, the UE synchronizes its timing with the BS and acquires information such as a cell ID by receiving a narrowband primary synchronization signal (NPSS) and a narrowband secondary synchronization signal (NSSS) from the BS. The UE may then acquire information broadcast in the cell by receiving a narrowband physical broadcast channel (NPBCH) signal from the BS (S1302). During the initial cell search, the UE may further monitor a DL channel state by receiving a DL RS.

After the initial cell search, the UE may acquire more detailed system information by receiving a narrowband PDCCH (NPDCCH) and receiving a narrowband PDSCH (NPDSCH) corresponding to the NPDCCH (S1302).

Subsequently, to complete the connection to the BS, the UE may perform a random access procedure with the BS (S1303 to S1306). Specifically, the UE may transmit a random access preamble on a narrowband physical random access channel (NPRACH) (S1303) and may receive an NPDCCH and an RAR to the preamble on an NPDSCH corresponding to the NPDCCH (S1304). The UE may then transmit a narrowband physical uplink shared channel (NPUSCH) by using scheduling information included in the RAR (S1305), and perform a contention resolution procedure including reception of an NPDCCH and an NPDSCH corresponding to the PDCCH (S1306).

After the above procedure, the UE may receive an NPDCCH signal and/or an NPDSCH signal from the BS (S1307) and transmit an NPUSCH signal to the BS (S1308) in a general UL/DL signal transmission procedure. Control information that the UE transmits to the BS is generically called UCI. The UCI includes an HARQ ACK/NACK, an SR, and CSI. The CSI includes a CQI, a PMI, an RI, and so on. In NB-IoT, the UCI is transmitted on an NPUSCH. The UE may transmit the UCI on the NPUSCH periodically, aperiodically, or semi-persistently according to a request/command of the network (e.g., BS).

A different NB-IoT frame structure may be configured according to an SCS. For example, the NB-IoT system may support a 15 kHz SCS and a 3.75 kHz SCS. NB-IoT may be considered for any other SCS (e.g., 30 kHz) with different time/frequency units, not limited to the 15 kHz SCS and the 3.75 kHz SCS. While the NB-IoT frame structure based on the LTE system frame structure has been described herein for the convenience of description, the present disclosure is not limited thereto, and methods described in the present disclosure may be extended to NB-IoT based on a frame structure of the next-generation system (e.g., NR system).

Figure 14:
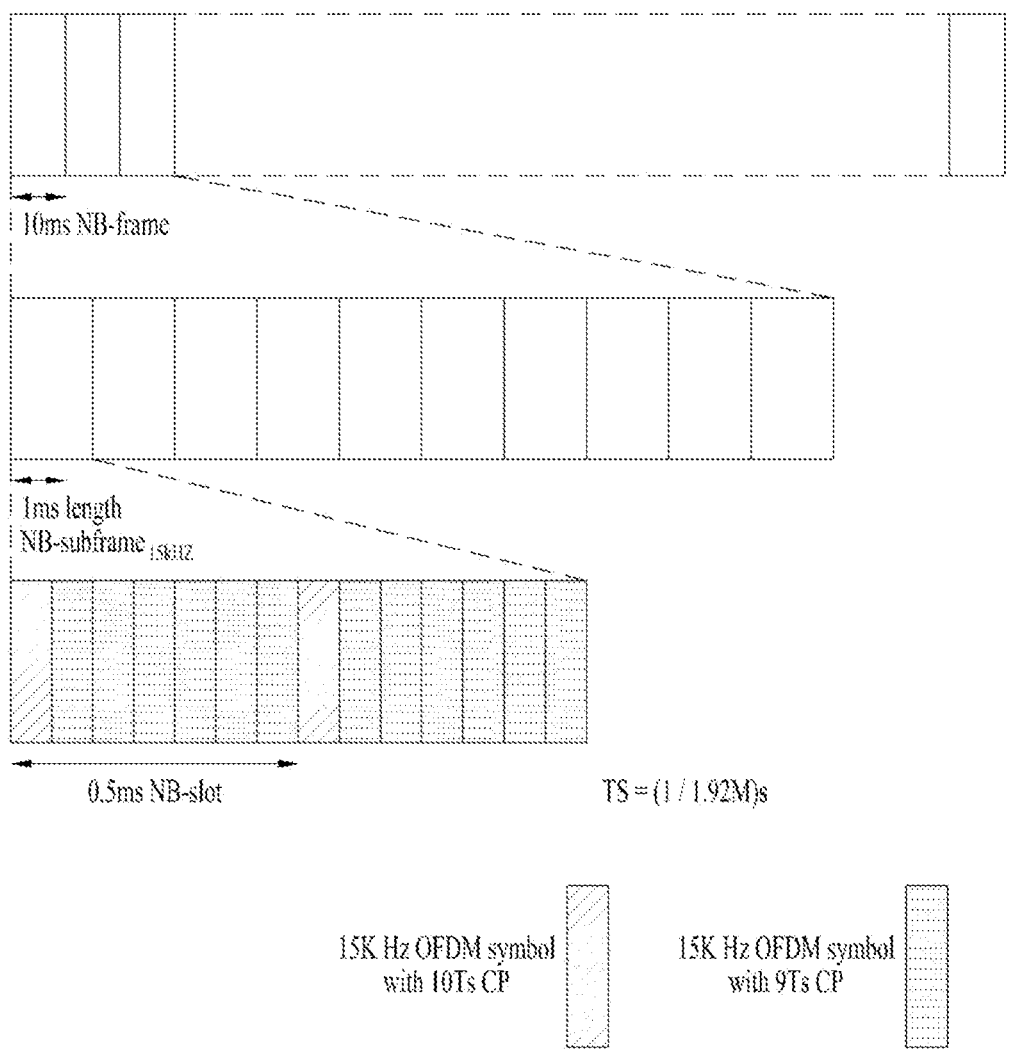
FIG. 14 is a diagram illustrating a frame structure with a subcarrier spacing (SCS) of 15 kHz.
Figure 15:
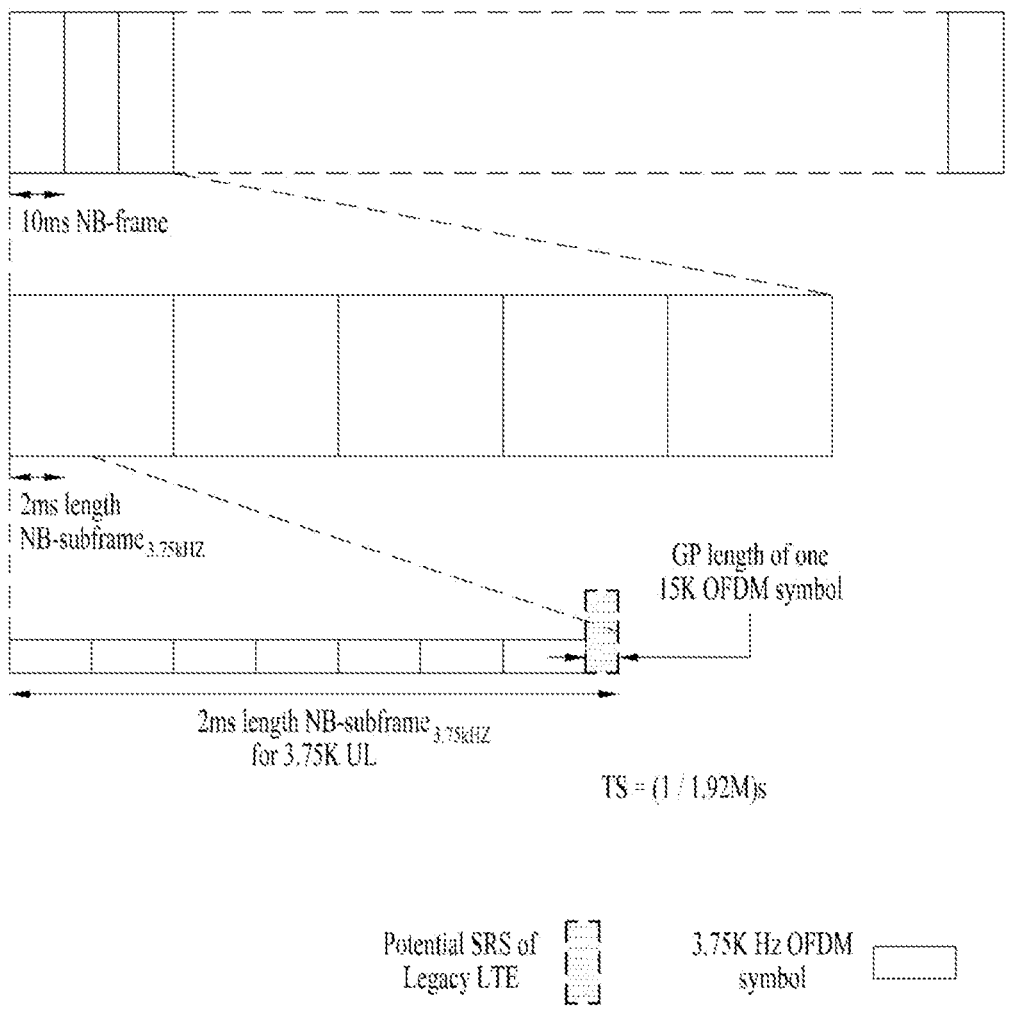
FIG. 15 is a diagram illustrating a frame structure with an SCS of 3.75 kHz.

FIG. 14 is a diagram illustrating a frame structure with an SCS of 15 kHz, and FIG. 15 is a diagram illustrating a frame structure with an SCS of 3.75 kHz.

Referring to FIG. 14, an NB-IoT frame structure for the 15 kHz SCS may be configured to be identical to the frame structure of the above-described legacy system (i.e., LTE system). That is, a 10-ms NB-IoT frame may include 10 1-ms NB-IoT subframes, each including two 0.5-ms NB-IoT slots. Each 0.5-ms NB-IoT slot may include 7 OFDM symbols.

Referring to FIG. 15, for the 3.75 kHz SCS, a 10-ms NB-IoT frame includes 5 2-ms NB-IoT subframes, each including 7 OFDM symbols and one guard period (GP). A 2-ms NB-IoT subframe may also be referred to as an NB-IoT slot or an NB-IoT resource unit (RU).

NB-IoT DL physical resources may be configured based on the configuration of physical resources in another wireless communication system (e.g., LTE or NR), except that an NR system bandwidth is a certain number of RBs (e.g., one RB, i.e., 180 kHz). For example, when the NB-IoT DL supports only the 15 kHz SCS, the NB-IoT DL physical resources may be configured as the resource area of one RB (i.e., one PRB) in the frequency domain, to which the resource grid of the LTE system illustrated in FIG. 4 is limited, as described above. Likewise, for NB-IoT UL physical resources, the system bandwidth may be limited to one RB.

Figure 16:
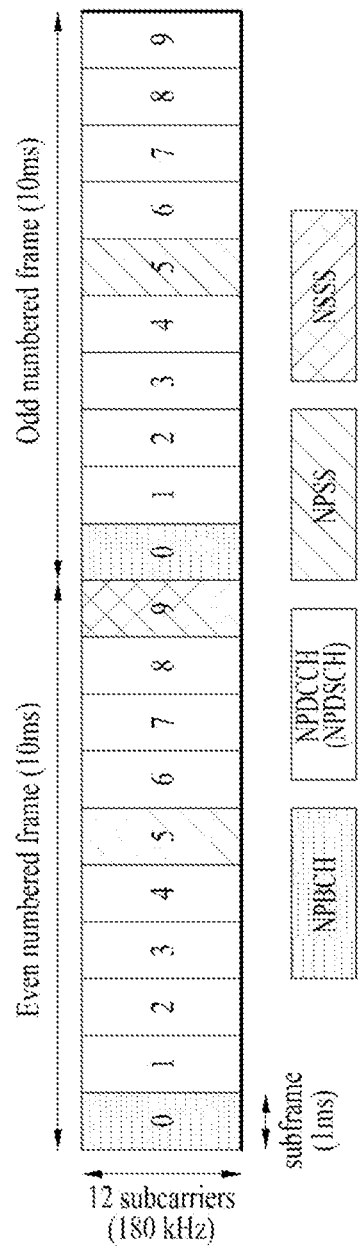
FIG. 16 is a diagram illustrating transmission of NB-IoT DL physical channels/signals.

FIG. 16 illustrates transmission of NB-IoT DL physical channels/signals. An NB-IoT DL physical channel/signal is transmitted in one PRB and supports the 15 kHz SCS/multi-tone transmission.

Referring to FIG. 16, the NPSS is transmitted in the sixth subframe of every frame, and the NSSS is transmitted in the last (e.g., tenth) subframe of every even-numbered frame. A UE may acquire frequency, symbol, and frame synchronization using the synchronization signals (NPSS and NSSS) and search 504 physical cell IDs (PCIDs) (i.e., BS IDs). The NPBCH is transmitted in the first subframe of every frame, carrying an NB-MIB. The NRS is provided as an RS for DL physical channel demodulation and generated in the same manner as in LTE. However, an NB-PCID (NCell ID or NB-IoT BS ID) is used as an initialization value for generation of an NRS sequence. The NRS is transmitted through one or two antenna ports. The NPDCCH and the NPDSCH may be transmitted in the remaining subframes except for the subframes carrying the NPSS, the NSSS, and the NPBCH. The NPDCCH and the NPDSCH may not be transmitted in the same subframe. The NPDCCH carries DCI, and the DCI supports three types of DCI formats. DCI format N0 includes NPUSCH scheduling information, and DCI formats N1 and N2 include NPDSCH scheduling information. The NPDCCH may be transmitted up to 2048 times, for CE. The NPDSCH is used to transmit data (e.g., TB) of a transport channel such as a DL-SCH and a paging channel (PCH). A maximum TB size (TBS) is 680 bits, and a TB may be repeatedly transmitted up to 2048 times, for CE.

NB-IoT UL physical channels include narrowband PRACH (NPRACH) and NPUSCH, and support single-tone transmission and multi-tone transmission. Single-tone transmission is supported for the SCSs of 3.5 kHz and 15 kHz, and multi-tone transmission is supported only for the 15 kHz SCS.

SC-FDMA may be applied to NB-IoT UL based on the SCS of 15 kHz or 3.75 kHz. Multi-tone transmission and single-tone transmission may be supported for the NB-IoT UL. For example, multi-tone transmission is supported only for the 15 kHz SCS, and single-tone transmission may be supported for the SCSs of 15 kHz and 3.75 kHz.

As mentioned in relation to the NB-IoT DL, the physical channels of the NB-IoT system may have names added with "N (Narrowband)" to distinguish them from the channels of the existing systems. For example, the NB-IoT UL physical channels may include NPRACH, NPUSCH, and so on, and the NB-IoT UL physical signals may include narrowband DMRS (NDMRS).

The NPUSCH may be configured in NPUSCH format 1 or NPUSCH format 2. For example, NPUSCH format 1 may be used to carry (or deliver) a UL-SCH, and NPUSCH format 2 may be used to transmit UCI such as an HARQ ACK.

Characteristically, the UL channel of the NB-IoT system, NPRACH may be repeatedly transmitted, for CE. In this case, frequency hopping may be applied to the repeated transmissions.

E. Symbols, Abbreviations, and Terms

Symbols/abbreviations/terms used herein are defined as follows.

PDCCH: Physical downlink control channel. The PDCCH is a communication channel in the physical layer, for providing DCI. The proposed methods of the present disclosure are applicable to PDCCHs of various structures such as enhanced PDCCH (EPDCCH), MTC-PDCCH (MPDCCH), and narrowband-PDCCH (NPDCCH), even though not specified. The PDCCH is used as a term representing the PDCCHs of various structures, although not specified separately.

PUCCH: Physical uplink control channel. The PUCCH is a communication channel in the physical layer, for providing UCI. The proposed methods of the present disclosure are applicable to PUCCHs of various structures, even though not specified. The PUCCH is used as a term representing the PUCCHs of various structures, although not specified separately.

PDSCH: Physical downlink shared channel. The PDSCH is a communication channel in the physical layer, for providing DL data. The proposed methods of the present disclosure are applicable to PDCCHs of various structures such as narrowband-PDSCH (NPDSCH), even though not specified. The PDSCH is used as a term representing the PSCCHs of various structures, although not specified separately.

PUSCH: Physical uplink shared channel. The PUSCH is a communication channel in the physical layer, for providing UL data. The proposed methods of the present disclosure are applicable to PUSCHs of various structures such as narrowband-PUSCH (NPUSCH), even though not specified. The PUSCH is used as a term representing the PUSCHs of various structures, although not specified separately.

DCI: Downlink control information

UCI: Uplink control information

NDI: New data indicator. The NDI may be included in DCI (transmitted/received on the PDCCH) and indicates whether new data is transmitted/receives or previous data is retransmitted on a PDSCH/PUSCH scheduled by the DCI.

CB: Code block

CBG: Code block group

TB: Transport block

TBS: Transport block size

MCS: Modulation and coding scheme

SF: Subframe

RE: Resource element

RB: Resource block

HARQ: Hybrid automatic repeat request

SIB: System information block

LAA: licensed assisted access. A band defined in the LTE/LTE-A/LTE-A Pro/5G/NR system is referred to as a licensed bandwidth, and a band that is not defined in the LTE/LTE-A/LTE-A Pro/5G/NR system such as a Wi-Fi band or a Bluetooth (BT) band is referred to as an unlicensed bandwidth. An operation method in an unlicensed band is referred to as an LAA scheme.

Scheduling delay: The interval between the last transmission position (e.g., SF or slot) of the PDCCH dynamically scheduled by DCI and the starting transmission position (e.g., SF or slot) of a scheduled TB (PUSCH or PDSCH).

FH: Frequency hopping. An FH indicator is a DCI field indicating FH, and FH indication information is information indicating whether FH is enabled/disabled.

RA: Resource assignment

RV: Redundancy version

QAM: Quadrature amplitude modulation

MCL: Maximum coupling loss

F. Proposed Methods of the Present Disclosure

F.1. Technical Problem

In communication systems such as LTE and NR, one DCI is generally used to schedule one PDSCH or PUSCH. When a plurality of TBs or HARQ processes are to be scheduled, the UE generally needs to monitor a plurality of different search spaces to obtain DCI that schedules each TB or HARQ process. However, when the size of transmission data is larger than a TBS transmittable at one time on a PDSCH/PUSCH or when continuous PDSCH/PUSCH transmissions are required for such a reason as the need for periodic data transmission, repeated PDCCH transmissions may increase the network overhead of the BS, and repeated PDCCH monitoring may cause power consumption in the UE. To solve these problems, a multi-TB scheduling (multiple-TB scheduling) structure for scheduling a plurality of TBs by one DCI may be considered. In the multi-TB scheduling structure, network overhead caused by repeated PDCCH transmissions may be reduced, and power consumption for detecting an additional DCI may be reduced in the UE. In LTE, a multi-SF scheduling structure for controlling a plurality of PUSCH transmissions by one DCI in LAA communication has been proposed. In this structure, the BS may schedule PUSCH transmissions corresponding to up to four HARQ processes by one DCI, and the UE may perform a plurality of PUSCH transmissions only by one PDCCH monitoring. Similarly, in the current Rel-16 NB-IoT/MTC item, a multi-TB scheduling technique for scheduling a plurality of TBs by one DCI is under discussion.

A multi-TB scheduling method under discussion in Rel-16 MTC is to support up to 8 HARQ processes in CE mode A and up to 4 HARQ processes in CE mode B. As the maximum number of TBs schedulable by one DCI is increased, overhead required for a DCI transmission may be reduced. However, the amount of information required for simultaneous scheduling of multiple TBs increases, thereby significantly increasing the number of required DCI bits. Particularly, considering that decoding reliability should be maintained to satisfy a target MCL in a system that should support enhanced coverage such as MTC, the number of DCI bits should be considered important in the design of DCI for multi-TB scheduling.

To solve the above problem, the present disclosure proposes methods of reducing the number of required DCI bits based on a correlation between some scheduling parameters in a DCI design process of a multi-TB scheduling method. Characteristically, the present disclosure proposes a method of determining the sizes and interpretations of specific DCI fields by information included in other DCI fields, when a plurality of TBs or HARQ processes are schedulable by one DCI, and also proposes a related TB transmission/reception procedure.

Proposed methods of the present disclosure may be applied to a multi-TB scheduling technique that controls transmission of one or more TBs by using one DCI in MTC and NB-IoT implemented in the LTE system. MTC and NB-IoT have low complexity and wide coverage requirements for UEs, and decoding reliability may be considered important to satisfy target MCL performance. Alternatively, the proposed methods of the present disclosure may be applied to multi-SF scheduling (or multiple-SF scheduling) for scheduling one or more PUSCH transmissions by one DCI, as in LAA implemented in the LTE system. As described before, when additional information is introduced to multi-SF scheduling DCI defined in the current LAA, the present disclosure may be applied, which is proposed to allow a new operation while the number of required DCI bits is maintained as much as possible.

Further, the same solution may be considered for an unlicensed band (U-band) technology being discussed in the NR system in view of similarity between the U-band technology of the NR system and the LAA technology of the LTE system. Specifically for the U-band technology, discussions are underway for multi-TTI scheduling or multiple-TTI scheduling in which one DCI schedules TBs in one or more slots, and a DCI design with low overhead may be sought. In addition, one of candidate technologies discussed for power saving of a UE in the NR system is multi-slot scheduling or multiple-slot scheduling for scheduling one or more PDSCH/PUSCHs by one DCI. Similarly, methods proposed for the purpose of scheduling non-consecutive TBs or HARQ process IDs may be applied. In addition to the examples of technologies to which the proposed methods described above may be applied, the present disclosure proposed to design a control channel carrying DCI or UCI in a general communication system may be applied, as far as the principle of the present disclosure is maintained.

F.2. Proposed Methods of the Present Disclosure

As an example to which the proposed methods of the present disclosure are applied, multi-TB scheduling (multiple-TB scheduling) may be considered, in which one or more TBs are dynamically scheduled by one DCI in a communication system such as LTE and NR. A TB is a unit in which one transmission is performed, and the term TB may be replaced with another term describing a transmission unit for scheduling in an applied technology (e.g., CB, CBG, subframe, slot, symbol, RE, RB, HARQ process, or the like).

Figure 17:
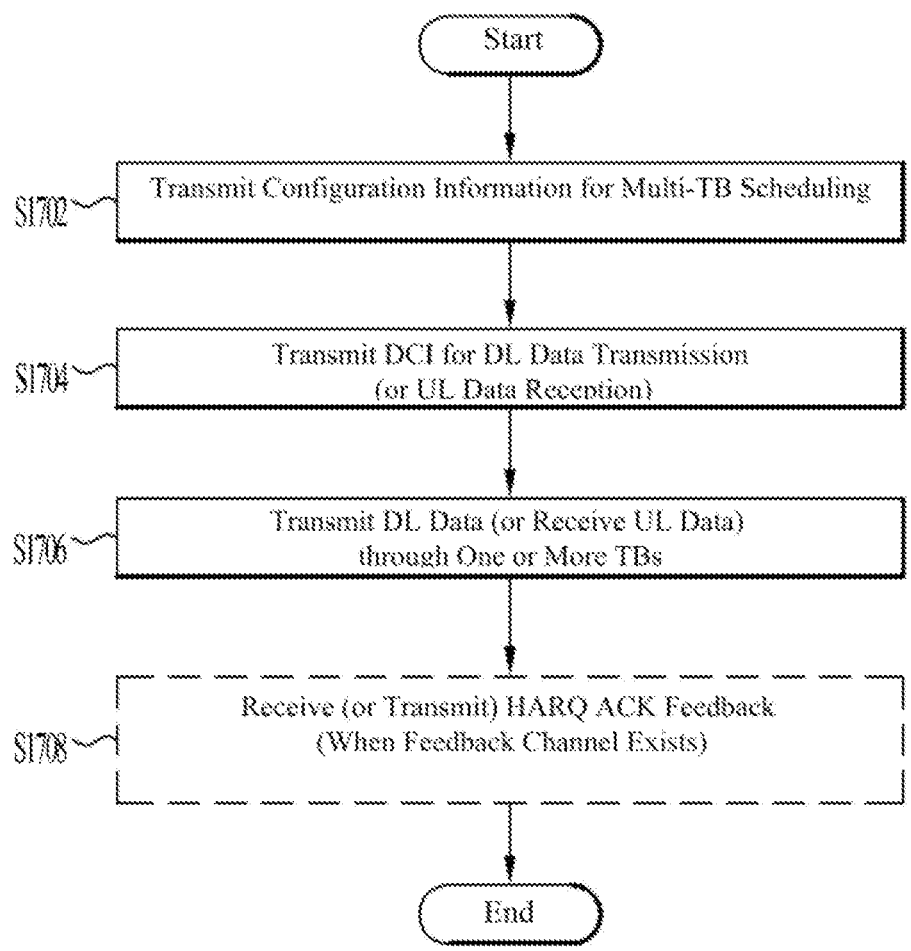
FIGS. 17 and 18 are flowcharts illustrating an operation to which methods proposed in the present disclosure are applicable.

FIG. 17 is a flowchart illustrating a BS operation to which the proposed methods of the present disclosure are applicable. The illustrated case of FIG. 17 is merely an example, which should not be construed as limiting the proposed methods of the present disclosure. For example, even though some operations of FIG. 17 are not performed, the proposed methods of the present disclosure may be applied. Further, even though an operation not illustrated in FIG. 17 is added, the proposed methods of the present disclosure may be applied.

Referring to FIG. 17, to support multi-TB scheduling, a BS may signal (or transmit) configuration information for the multi-TB scheduling (e.g., information indicating support of multi-TB scheduling and parameters related to the multi-TB scheduling) to a UE (S1702). For example, the signaling may be information configured by higher-layer signaling such as an SIB or RRC signaling or information configured dynamically by DCI. Subsequently, in the presence of data to be transmitted to the UE or data to be received from the UE, the BS transmits DCI that schedules (transmission/reception of) one or more TBs (or DCI for DL data transmission or DCI for UL data reception) to the UE (S1704). In the presence of transmission data, the BS performs a DL data transmission (in the one or more TBs) after the DCI transmission (S1704). When the BS needs an HARQ-ACK feedback channel (for the TBs or DL data), the BS performs an operation of receiving the HARQ-ACK feedback channel (S1708). In the presence of data to be received, the BS performs a UL data reception (in the one or more TBs) after the DCI transmission (S1704). When the BS needs an HARQ-ACK feedback channel (for the TBs or UL data), the BS performs an operation of transmitting the HARQ-ACK feedback channel (S1708). When no HARQ-ACK feedback is needed, the transmission/reception of the HARQ-ACK feedback channel (S1708) may be skipped.

Figure 18:
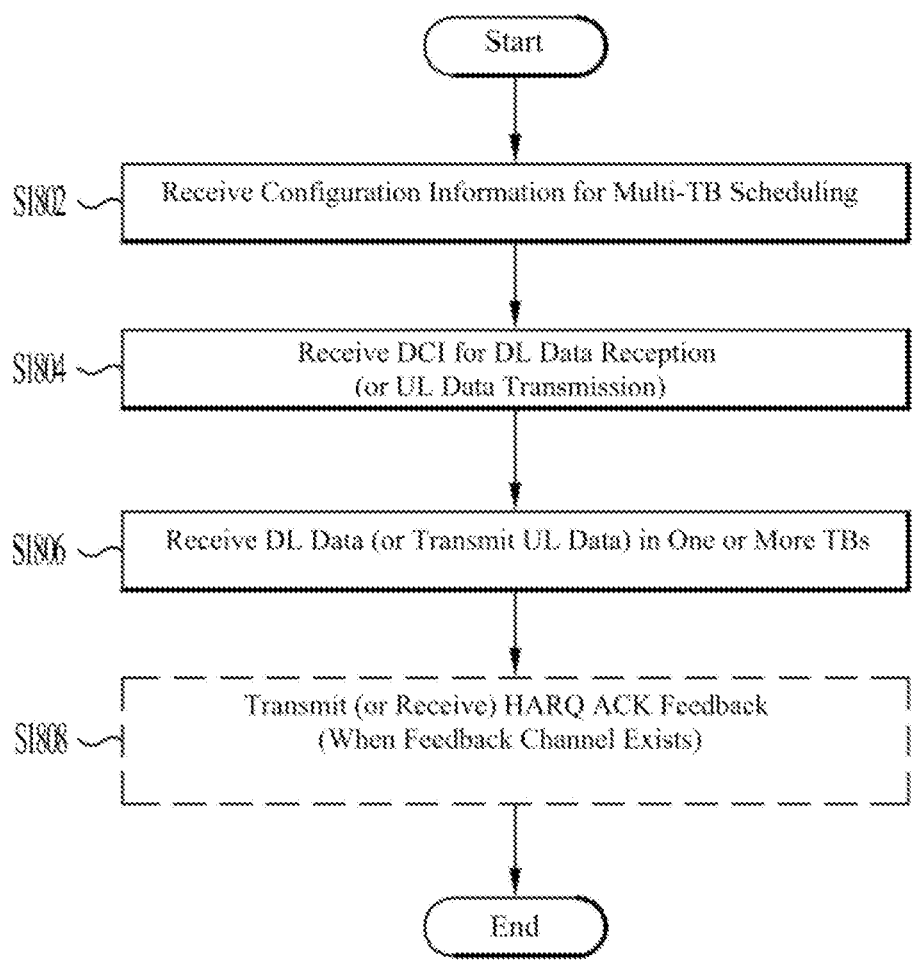

FIG. 18 is a flowchart illustrating a UE operation to which the proposed methods of the present disclosure are applicable. The illustrated case of FIG. 18 is merely an example, which should not be construed as limiting the proposed methods of the present disclosure. For example, even though some operations of FIG. 18 are not performed, the proposed methods of the present disclosure may be applied. Further, even though an operation not illustrated in FIG. 18 is added, the proposed methods of the present disclosure may be applied.

Upon receipt of signaling including configuration information for multi-TB scheduling (e.g., information indicating support of multi-TB scheduling and parameters related to the multi-TB scheduling) (S1802), the UE may monitor DCI that schedules one or more TBs (or DCI for multi-TB scheduling) (S1804). For example, the signaling may be information configured by higher-layer signaling such as an SIB or RRC signaling or information configured dynamically by DCI. Upon detection/reception of DCI including information that schedules one or more TBs (or information for multi-TB scheduling) (S1804), the UE identifies the transmission/reception positions of the TBs based on the signaling and scheduling information included in the DCI. In the presence of data to be received, the UE receives (DL data in) the one or more TBs after the DCI reception (S1806). When the UE needs an HARQ-ACK feedback channel (for the TBs or DL data), the UE performs an operation of transmitting the HARQ-ACK feedback channel (S1808). In the presence of data to be transmitted, the UE transmits (UL data in) the one or more TBS after the DCI reception (S1806). When the UE needs an HARQ-ACK feedback channel (for the TBs or UL data), the UE performs an operation of receiving the HARQ-ACK feedback channel (S1808).

Figure 19:
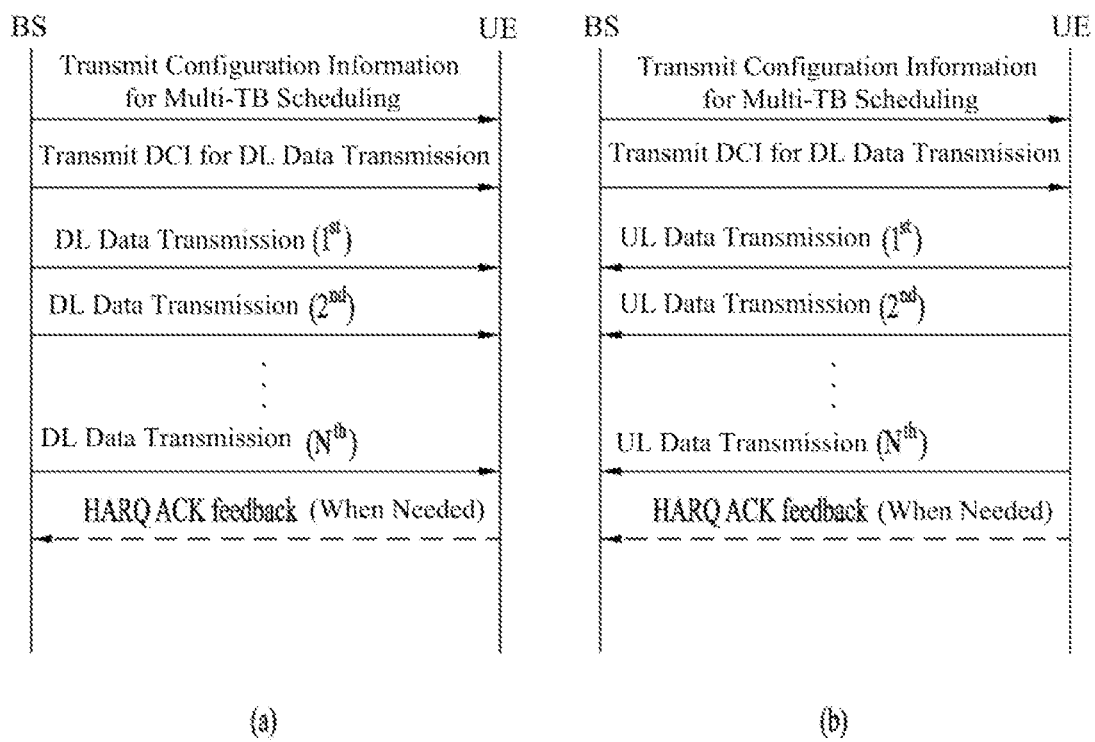
FIG. 19 is a diagram illustrating a transmission/reception process between a base station (BS) and a user equipment (UE), to which the proposed methods of the present disclosure are applicable.

FIG. 19 is a diagram schematically illustrating a transmission/reception process between a BS and a UE.

In the example of FIGS. 17 to 19, when the system supports MTC, DCI may be transmitted/received on an MPDCCH (S1704 or S1804), UL data may be transmitted/received at least once on a PUSCH (S1706 or S1806), DL data may be transmitted/received at least once on a PDSCH (S1706 or S1806), and an HARQ-ACK feedback may be transmitted/received at least once on a PUCCH (S1708 or S1808) (e.g., see "C. MTC (Machine Type Communication)"). In the example of FIGS. 17 to 19, when the system supports NB-IoT, DCI may be transmitted/received on an NPDCCH (S1704 or S1804), UL data may be transmitted/received at least once on an NPUSCH (S1706 or S1806), DL data may be transmitted/received at least once on an NPDSCH (S1706 or S1806), and an HARQ-ACK feedback may be transmitted/received at least once on an NPUSCH (S1708 or S1808) (e.g., see "D. NB-IoT (Narrowband-Internet of Things)"). NPDCCH and MPDCCH may be collectively referred to as PDCCH, NPUSCH may be collectively referred to as PUSCH, and NPDSCH may be collectively referred to as PDSCH.

While a BS operation and a UE operation have been described above in the context of multi-TB scheduling using one DCI, by way of example, the principle of the present disclosure may also be applied to other information transmission schemes such as a UL control channel using UCI.

In the proposed methods of the present disclosure, some of the following methods may be selectively applied. Each method may be performed independently or one or more methods may be performed in combination. Some terms, symbols, sequences, and so on used to describe the present disclosure may be replaced with other terms, symbols, sequences, and so on, as far as the principle of present disclosure is maintained.

(Method 1)

In Method 1 of the present disclosure, the same TB may be repeatedly transmitted for coverage extension, and a repetition number for the TB may be configured by the BS. For example, repeated TB transmissions may amount to repeated transmissions, in subframes, of a physical channel scheduled for data transmission by DCI such as a PDSCH or a PUSCH, as is done in MTC.

When the DCI may include both of RV indication information and FH indication, the present disclosure proposes a method of interpreting the RV indication information and the FH indication information in a different manner according to a repetition number configured by the BS. This proposed method may be used to reduce the total number of bits in the DCI based on the characteristics of application of an RV and an FH.

When an RV is changed at each of repeated TB transmissions, that is, RC cycling is applied to the repeated TB transmissions, the proposed method may be advantageous. For example, when there are a total of four available RV states (e.g., RV0, RV1, RV2, and RV3) as in MTC, and an RV is cyclically used for each subframe, more RVs are used for a larger repetition number. The resulting increased probability of using all RV states decreases the need for RV scheduling by DCI. Further, when a TB is not repeated, there is no period to which FH is applied, which obviates the need for including an FH indicator in the DCI and thus makes application of the proposed method advantageous.

In an example of Method 1, a total of 2 bits in DCI may be used to indicate an RV and FH. When a TB scheduled by the DCI is not repeatedly transmitted, the 2 bits are used to indicate the RV in the 2-bit DCI field, while FH may always be fixed. When it is said that FH is always fixed, this may mean that FH is always disabled (or a value indicating disable is always applied to FH), or FH is semi-statically enabled/disabled by higher-layer signaling such as an SIB or RRC signaling. Alternatively, FH may be implicitly determined based on other parameters in the DCI, rather than FH is always fixed. When the TB scheduled by the DCI is repeatedly transmitted two or more times, it may be regulated that only one bit of the 2-bit DCI field is used to indicate an RV, and the remaining one bit is used as the FH indicator. When an RV is indicated in one bit, the RV may be one selected between RV0 (or an RV value of 0) and RV2 (or an RV value of 2). When an RV is indicated in two bits, the RV may be one selected from among RV0 (or an RV value of 0), RV1 (or an RV value of 1), RV2 (or an RV value of 2), and RV3 (or an RV value of 3). When the above example is applied to MTC, one bit may be reduced compared to a legacy DCI format in which an RV and FH are independently indicated in two bits and one bit, respectively. Further, when the repetition number is 1, RV states may be represented at the same level as the legacy DCI format. Only when the repetition number is 2 or larger, it is possible to apply FH and thus a frequency diversity gain may be expected. The above-described example is tabulated in Table 7.

TABLE 7

| Repetition | =1 | ≥2 |
| --- | --- | --- |
| FH | 0 bit | 1 bit |
| RV | 2 bit | 1 bit |

Referring to Table 7, the first one bit of two bits in total may be used as information about an RV regardless of whether a TB is repeated, and the second one bit of the 2 bits may be used as information about an RV or FH according to whether the TB is repeated. Accordingly, when the BS transmits DCI for multi-TB scheduling (e.g., S1704), the BS may indicate an RV by the first one bit of 2 bits included in the DCI, and additionally use the second one bit to indicate the RV or to indicate whether to apply FH. More specifically, when a TB scheduled by the DCI is not repeated, the BS may indicate the RV related to the TB by the second one bit. When the TB scheduled by the DCI is repeated two or more times, the BS may indicate whether to apply FH by the second one bit. When the second one bit is used to indicate the RV, the BS may transmit or receive the TB scheduled by the DCI based on the fixed FH and the indicated RV (e.g., S1706). When the second one bit is used to indicate FH, the BS may transmit or receive the TB scheduled by the DCI based on the indicated FH and the RV indicated by the first one bit (e.g., S1706).

When the UE receives DCI for multi-TB scheduling (S1704), the UE may use the second one bit of 2 bits included in the DCI to determine an RV or to determine whether to apply FH. More specifically, when a TB scheduled by the DCI is not repeated, the UE may determine an RV based on the second one bit, and when the TB scheduled by the DCI is repeated two or more times, the UE may determine whether to apply FH based on the second one bit. When the second one bit is used to determine the RV, the UE may transmit or receive the TB scheduled by the DCI based on the fixed FH and the determined RV (e.g., S1706). When the second one bit is used to determine FH, the UE may transmit or receive the TB scheduled by the DCI based on the determined FH and the RV indicated by the first one bit (e.g., S1706).

In another example of Method 1, when a total of two bits are used for RV indication and FH indication, and when a TB scheduled by DCI is not repeated or is repeated less than four times, the two bits of the 2-bit DCI field may be used to indicate an RV, while FH may always be fixed. When it is said that FH is always fixed, this may mean that FH is always disabled (or a value indicating disable is applied to FH), or FH is semi-statically enabled/disabled by higher-layer signaling such as an SIB or RRC signaling. Alternatively, FH may be implicitly determined based on other parameters of the DCI, rather than FH is always fixed. When the TB scheduled by the DCI is repeatedly transmitted four or more times, it may be regulated that only one bit of the 2-bit DCI field is used to indicate an RV, and the remaining one bit is used as the FH indicator. When an RV is indicated in one bit, the RV may be one selected between RV0 (or an RV value of 0) and RV2 (or an RV value of 2). When an RV is indicated in 2 bits, the RV may be one selected from among RV0 (or an RV value of 0), RV1 (or an RV value of 1), RV2 (or an RV value of 2), and RV3 (or an RV value of 3). When the above example is applied to MTC, one bit may be reduced compared to the legacy DCI format in which an RV and FH are independently indicated in two bits and one bit, respectively. Further, when the repetition number is 2 or less, RV states may be represented at the same level as the legacy DCI format. When the repetition number is 2 or less, a diversity gain achievable from FH may not be great. In this case, a higher RV gain may be intended instead of an FH gain. Additionally, when the repetition number is 4 or more, FH is applicable, and thus a frequency diversity gain may be expected. The above example is tabulated in Table 8.

TABLE 8

| Repetition | <4 | ≥4 |
|---|---|---|
| FH | 0 bit | 1 bit |
| RV | 2 bit | 1 bit |

The example of Table 8 is different from the example of Table 7, in terms of a repetition number based on which the second one bit is differently interpreted. Therefore, the UE operation and the BS operation described with reference to Table 7 are incorporated herein by reference, except that "when the TB scheduled by the DCI is not repeated" in the operation described with reference to Table 7 is replaced by "when the TB scheduled by the DCI is not repeated or is repeated less than four times", and "when the TB scheduled by the DCI is repeated two or more times" in the operation described with reference to Table 7 is replaced by "when the TB scheduled by the DCI is repeated four or more times".

In another example of Method 1, a total of one bit may be used for RV indication and FH indication. When a TB scheduled by DCI is not repeated or is repeated less than four times, the 1-bit DCI field may be used to indicate an RV, while FH may always be fixed. When it is said that FH is always fixed, this may mean that FH is always disabled (or a value indicating disable is applied to FH) or FH is semi-statically enabled/disabled by higher-layer signaling such as an SIB or RRC signaling. Alternatively, FH may be implicitly determined based on other parameters of the DCI, rather than FH is always fixed. When the TB scheduled by the DCI is transmitted repeatedly four or more times, or two or more times, the 1-bit DCI field may be used as the FH indicator, while an RV may always have a fixed value. When it is said that an RV is always fixed, this may mean that a specific RV value (e.g., RV0 or an RV value of 0) is used all the time, or an RV is semi-statically enabled/disabled by higher-layer signaling such as an SIB or RRC signaling. Alternatively, the RV may be implicitly determined (e.g., an initial transmission or a retransmission) based on other parameters of the DCI, rather than the RV is always fixed. When an RV is indicated in one bit, the RV may be one selected between RV0 (or an RV value of 0) and RV2 (or an RV value of 2). When an RV is indicated in two bits, the RV may be one selected from among RV0 (or an RV value of 0), RV1 (or an RV value of 1), RV2 (or an RV value of 2), and RV3 (or an RV value of 3). When the above example is applied to MTC, two bits may be reduced compared to the legacy DCI format in which an RV and FH are independently indicated in two bits and one bit, respectively. The above example is tabulated in Table 9.

TABLE 9

| Repetition | <4 | >4 |
|---|---|---|
| FH | 0 bit | 1 bit |
| RV | 1 bit | 0 bit |

In the example of Table 9, DCI includes one bit for an RV or FH, and the one bit may be used as information about the RV or FH according to TB repetition. Accordingly, when the BS transmits DCI for multi-TB scheduling (e.g., S1704), the BS may indicate an RV or indicate whether to apply FH by one bit included in the DCI. More specifically, when the TB scheduled by the DCI is not repeated or is repeated less than four times, the BS may indicate an RV related to the TB by the one bit, and when the TB scheduled by the DCI is repeated four or more times or two or more times, the BS may indicate whether to apply FH by the one bit. When the one bit is used to indicate an RV, the BS may transmit or receive the TB scheduled by the DCI based on the fixed FH and the indicated RV (e.g., S1706). When the one bit is used to indicate FH, the BS may transmit or receive the TB scheduled by the DCI based on the indicated FH and the fixed RV (e.g., S1706).

When the UE receives DCI for multi-TB scheduling (S1704), the UE may use one bit included in the DCI to determine an RV or to determine whether to apply FH. More specifically, when a TB scheduled by the DCI is not repeated or is repeated less than four times, the UE may determine an RV based on the one bit, and when the TB scheduled by the DCI is repeated four or more times or two or more times, the UE may determine whether to apply FH based on the one bit. When the one bit is used to determine an RV, the UE may transmit or receive the TB scheduled by the DCI based on fixed FH and the determined RV (e.g., S1706). When the one bit is used to determine whether to apply FH, the UE may transmit or receive the TB scheduled by the DCI based on the determined FH and a fixed RV (e.g., S1706).

When DCI may schedule RV indication information and FH indication information and at the same time, schedule subframe-wise repeated transmissions of a PDSCH/PUSCH as in MTC CE mode A, the BS may use the methods proposed in Method 1 to determine an RV and determine whether to apply FH according to a situation.

(Method 1-A)

The present disclosure proposes a method of implicitly determining the size of a DCI field that determines an RV for a TB scheduled by DCI according to a code rate applied to a transmission of the TB. The code rate refers to the ratio of the length of a codeword after rate matching to the length of data before channel coding, when the length of the actually transmitted codeword is determined during the rate matching after the data to be transmitted is channel-encoded (e.g., TBCC, turbo code, polar code, LDPC, or the like).

In an example of Method 1-A, the size of a DCI field indicating an RV may be determined in consideration of a puncturing ratio during rate matching of channel-encoded data based on scheduling information for a TB transmission (e.g., a TBS, the size of time/frequency-domain resources used for the TB transmission, and so on).

In a specific method of Method 1-A, it is assumed that up to M bits are available for a DCI field indicating an RV. Then, when X% or more of encoded data may be included in a TB transmission after rate matching, the size of the DCI field indicating an RV may be determined to be Y(≥0) bits. (M-Y) bits that are not used for RV indication may be included in a DCI field serving a purpose other than RV indication. On the other hand, when less than X% of the encoded data may be included in the TB transmission after the rate matching, the size of the DCI field indicating an RV may be determined to be Z(>Y) bits. (M-Z) bits that are not used for RV indication may be included in a DCI field serving a purpose other than RV indication.

The method proposed in Method 1-A may be intended to increase a coding gain by increasing the scheduling flexibility of an RV in consideration of the characteristics of a circular buffer in the UE and a coding gain brought by the RV, when many encoded bits are punctured during rate matching. On the contrary, when a smaller number of encoded bits are punctured during rate matching or when repetition is applied, a coding gain brought by an RV is low. Therefore, a gain (e.g., a FH-incurred diversity gain) may be achieved in a method other than the method proposed in Method 1-A.

(Method 1-B)

In the present disclosure, a case in which an FH indicator may be used for a different purpose by a higher-layer configuration as in MTC is considered. Because the methods proposed in Method 1 are for adaptively using RV information and FH information through joint encoding, when the FH indicator is used for a different purpose, Method 1 may be restrictively applied. To overcome this limitation, the proposed methods of the present disclosure may include a method of determining whether Method 1 is applied according to higher-layer signaling indicating whether the FH indicator is used for a different purpose.

In a characteristic example to which Method 1-B is applied, use of the FH indicator to support 64QAM in MTC may be considered. When 64QAM is to be supported for PDSCH transmission in CE mode A in MTC, it may be indicated that 64QAM is available by a higher-layer signal (e.g., RRC signal). When the repetition number is set to 2 or larger by DCI, a UE receiving the indication uses the FH indicator to determine whether FH is applied. When the repetition number is set to 1, the UE uses the FH indicator as an additional bit for an MCS field. When the FH indicator may be used for different purposes according to repetition numbers in this manner, there may be limitations in using methods of using the FH indicator to provide RV information in the case of a small number of PDSCH repetitions as in the methods proposed in Method 1.

To solve the above problems, the present disclosure proposes that when a DCI field available for transmission of information of an FH indicator is used for any other purpose by higher-layer signaling (e.g., RRC signaling), Method 1 is not applied, and when the higher-layer signaling does not exist or it is determined not to use the FH indicator for any other purpose, Method 1 is applied. In the above-described example of MTC, it may be regulated when a UE of CE mode A is configured to support 64QAM for PDSCH reception by higher-layer signaling (e.g., RRC signaling), Method 1 is not applied, and when it is not signaled whether 64QAM is supported (or 64QAM is not configured for PDSCH reception), Method 1 is applied.

In a specific example of the method proposed in Method 1-B, when a UE is configured to support 64QAM for PDSCH reception by higher-layer signaling (e.g., RRC signaling) in MTC CE mode A, a DCI field for providing an FH indicator exists. When the repetition number for the PDSCH is 1, the DCI field may be used for MCS interpretation (e.g., as an additional bit of the MCS field) to support 64QAM, and when the repetition number for the PDSCH is 2 or larger, the DCI field may be used as the FH indicator without separately providing information about an RV. On the contrary, when it is not signaled whether 64QAM is supported (or 64QAM is not configured for PDSCH reception), the method of using one bit of DCI as the FH indicator for the repetition number set to 4 (or 1) or larger, and using the one bit for providing RV information for the repetition number set to be less than 4 (or 2) as described in Table 9 proposed in Method 1 may be used.

The proposed methods of Method 1-B may include a method of using different DCI field interpretations for a case in which a DCI field available for transmission of information of an FH indicator is used for any other purpose by higher-layer signaling (e.g., RRC signaling) and a case in which the DCI field is used for its original purpose. For example, in the case where one bit is designated as a field for FH and RV information in the example of MTC, when 64QAM support is determined for a UE not configured to use 64QAM by higher-layer signaling (e.g., RRC signaling), the DCI field interpretation method as illustrated in Table 9 proposed in Method 1 may be applied to the UE. On the other hand, when the UE is configured to use 64QAM by higher-layer signaling (e.g., RRC signaling), for a repetition number set to 1, the one bit may be used as an MCS interpretation field (or an additional bit of the MCS field) for supporting 64QAM. For a repetition number set to 2, the one bit may be used as an RV interpretation field. For a repetition number set to 4, the one bit may be used as an FH indicator, as illustrated in Table 10.

TABLE 10

| Repetition | =1 | =2 | ≥4 |
|---|---|---|---|
| FH | 0 bit | 0 bit | 1 bit |
| RV | 0 bit | 1 bit | 0 bit |
| 64 QAM | 1 bit | 0 bit | 0 bit |

It may be assumed that a UE supporting 64QAM is generally in a good MCL (i.e., good coverage) state, and thus it may be predicted that the UE may have a low retransmission probability. Further, when 64QAM is used, the amount of information transmittable in one RE greatly increases. Therefore, there is a high possibility that no bit is punctured or a relatively small number of bits are punctured during rate matching. Considering this characteristic, it may be expected that a UE configured to use 64QAM will have a relatively small gain from a retransmission scheme in which an RV is designated. In this respect, the method proposed in Method 1-B is advantageous in that it may be determined whether to provide an RV according to a requirement level of RV information. Further, network overhead may be reduced because an existing higher-layer signal is reused without causing signaling overhead for indicating this operation.

(Method 2)

In the present disclosure, multi-TB scheduling is considered to dynamically schedule one or more TBs by one DCI. Further, a case in which the plurality of TBs scheduled by the DCI always have consecutive HARQ process IDs is considered. In this case, to represent the dynamic number of TBs together with the HARQ process IDs, the DCI may include information about the number of scheduled TBs and information about a starting HARQ process ID. For example, when up to 8 TBs are schedulable by one DCI as in MTC CE mode A, X (≤8) TBs may be dynamically scheduled, and sequential HARQ process IDs for the X TBs, #Y, #(mod(Y+1, 8)), . . . , #(mod(Y+X−1, 8)) may be calculated based on information Y about the starting one of the scheduled HARQ process IDs.

The present disclosure proposes a method of differently interpreting a bitmap representing NDI information about scheduled TBs, information about the starting one of HARQ process IDs for the scheduled TBs, and some other scheduling information, according to the number of TBs dynamically scheduled by DCI. In the proposed method, some other scheduling information includes MCS/TBS information based on which the code rate of a codeword carried by a TB may be determined in MTC and RA information based on which a frequency-domain resource area used for RE mapping is determined. The proposed method may be used for the purpose of reducing the total number of bits of DCI in consideration of a specific situation that may be mainly applied when a plurality of TBs are scheduled.

The proposed method may be advantageous in a situation in which when payload larger than the maximum size of payload schedulable in one TB is to be transmitted, multi-TB scheduling is used to reduce network overhead by reducing the number of DCI transmissions. For example, when multi-TB scheduling is used and the same TBS is applied to all TBs scheduled by one DCI, scheduling of X (<Y) TBs with a small TBS may be supported by scheduling of Y TBs with a large TBS. Therefore, a method of reducing the number of DCI bits may be considered, instead of limiting some of a plurality of scheduling methods for supporting the same payload.

A method proposed in Method 2 may be configured by combining one or more of the following options.

(Option 2-1) Method 2 may include a method of determining the size of a DCI field indicating information about the starting one of the HARQ process IDs of TBs scheduled by DCI according to the number of the scheduled TBs, like Option 2-1. Characteristically, as the number of TBs scheduled by one DCI increases, a method of reducing the number of bits representing the starting one of the HARQ process IDs of the scheduled TBs may be considered. For example, in the case where up to 8 TBs are schedulable by one DCI as in CE mode A of MTC, when all 8 TBs are scheduled by multi-TB scheduling DCI, information about the starting HARQ process ID may not be required. On the other hand, when only a small number of TBs are scheduled, a maximum number of cases should be supported to utilize all the HARQ process IDs. For example, a 3-bit DCI field may be needed to represent all numbers from 1 to 8.

(Option 2-2) Method 2 may include a method of determining the size of a bitmap representing the NDIs of TBs scheduled by DCI according to the number of the scheduled TBs, like Option 2-2. In general, the bitmap may need as many bits as a minimum number of scheduled TBs in order to represent NDIs. Therefore, a method of adaptively reducing the size of an NDI bitmap for a small number of scheduled TBs and adaptively increasing the size of the NDI bitmap for a large number of scheduled TBs may be used. For example, in the case where up to 8 TBs are schedulable by one DCI as in CE mode A of MTC, when all 8 TBs are scheduled by multi-TB scheduling DCI, the size of a required NDI bitmap may be 8 bits. On the other hand, when only X (<8) TBs are scheduled, 8−X bits are useless in terms of representing NDIs. Therefore, the size of the NDI bitmap may be reduced to be used for any other purpose, to thereby reduce the whole DCI size. In this example, the NDIs may be represented in the same number of bits as the number of scheduled TBs (X bits) and the remaining bits (8−X bits) are not used to represent the NDIs.

(Option 2-3) As in Option 2-3, the size of a DCI field indicating an MCS/TBS may be determined according to the number of TBs scheduled by DCI in Method 2. Characteristically, as the number of TBs scheduled by one DCI increases, a method of reducing the size of bits representing MCS/TBS information may be considered. This method may be intended to reduce the total DCI size instead of reducing unnecessary scheduling flexibility, when the same payload as described above may be accommodated in one or more scheduling schemes. For example, in the case where up to 8 TBs are schedulable by one DCI as in CE mode A of MTC, when a plurality of TBs (e.g., 2 to 7 TBs) are scheduled, the size of a DCI field indicating an available MCS/TBS may be adaptively determined. The size of the DCI field may be less than or equal to the size of a DCI field indicating an MCS/TBS used when one TB is scheduled.

(Option 2-4) As in Option 2-4, the size of a DCI field indicating an RA may be determined according to the number of TBs scheduled by DCI in Method 2. Characteristically, as the number of TBs scheduled by one DCI increases, a method of reducing the size of bits representing RA information may be considered. This may be intended to exclude allocation of a small-size frequency domain resource to ensure the code rate of each TB, when it may be assumed that especially when a plurality of TBs are scheduled by applying Option 2-3, only a large TBS is selected. On the contrary, when a small-size RA is used for a large TBS per TB, a code rate may increase, thereby degrading decoding performance and causing the difficulty of supporting a target MCL. For example, in the case where up to 8 TBs are schedulable by one DCI as in CE mode A of MTC, the size of the DCI field indicating an RA available when a plurality of TBs (2 to 7 TBs) are scheduled may be determined adaptively. The size of the DCI field may be less than or equal to the size of the DCI field indicating an RA which is used when one TB is scheduled.

(Option 2-5) As in Option 2-5, the size of a DCI field specifying an MCS and/or an RA may be determined by a flag bit(s) field included in DCI in Method 2. Characteristically, a method of determining a configuration scheme for the remaining DCI bits according to flag information included in DCI, and reducing the number of bits indicating MCS and/or RA information in a configuration scheme for some DCI fields may be considered. Particularly because a small TBS leads to a small number of bits (or states) required to represent HARQ IDs and NDIs, more information may be transmitted. Thus, this method may be intended to reduce the computation complexity of a UE and maximize the size of available information. Characteristically, in the multi-TB scheduling DCI using the flag bit(s) field, the flag bit(s) field may be used to distinguish a method of supporting the MCS and RA field to have a smaller size compared to the legacy DCI for single-TB scheduling only from a method of supporting an MCS and an RA at the same level as the legacy DCI for single-TB scheduling only, when only a smaller number of TBs (e.g., one or two TBs) are scheduled.

Table 11 tabulates an example of designing some areas of DCI fields by combining Option 2-1, Option 2-2, Option 2-3, and Option 2-4 in a situation in which up to 8 TBs are schedulable by one DCI. In the example of the following table, as the number of scheduled TBs increases, the size of a bitmap representing NDIs increases according to the number of the TBs. The numbers of DCI bits representing an MCS, an RA, and a starting HARQ process ID may decrease according to the increased size of the NDI bitmap, and as a result, the total size of DCI fields may be maintained equal. In the following example, the number of bits representing an RA may mean a required minimum number of bits, and one to four bits may be added according to the size of a bandwidth in which a PDSCH may be transmitted.

TABLE 11

| Number of scheduled TBs | Size of DCI fields | | | |
|---|---|---|---|---|
| | Starting HARQ process ID | NDI bitmap | MCS | Resource assignment |
| 8 | 0 bit | 8 bit | 2 bit | 2 bit |
| 7 | 1 bit | 7 bit | 2 bit | 2 bit |
| 6 | 2 bit | 6 bit | 2 bit | 2 bit |
| 5 | 3 bit | 5 bit | 2 bit | 2 bit |
| 4 | 3 bit | 4 bit | 2 bit | 3 bit |
| 3 | 3 bit | 3 bit | 2 bit | 4 bit |
| 2 | 3 bit | 2 bit | 3 bit | 4 bit |
| 1 | 3 bit | 1 bit | 4 bit | 4 bit |

Table 12 tabulates an example of designing some areas of DCI fields by combining Option 2-2 and Option 2-5 in a situation where up to 8 TBs are schedulable by one DCI. In the example of the following table, the sizes of DCI fields representing an MCS and an RA may be determined according to the state of a flag bit. For the determination, a method of using the same sizes as those of MCS and RA fields in the legacy single-TB scheduling DCI and a method of decreasing the size of each of the MCS and RA fields by 1 bit are available. In the example of the following table, Others means all cases in which the method of reducing the MCS/RA field by a flag is applied, which may be designed by combining other methods and options proposed in the present disclosure (e.g., Option 2-1, Option 2-2, Option 2-3, and Option 2-4). In the example of the following table, the states of the flag are an example given for illustrative purposes, and the spirit of the present disclosure is equally applicable to other methods of representing a flag. Further, in the following example of the flag, the flag bit(s) field may not exist according to a previously determined upper flag bit or information included in other fields. In this case, the bit sizes of the MCS and RA fields may be determined to correspond to Others. In the following example, the size of bits representing an RA means a required minimum number of bits, and 1 to 4 bits may be added according to the size of a bandwidth in which a PDSCH may be transmitted.

TABLE 12

| Number of scheduled TBs | Size of DCI fields | | | |
|---|---|---|---|---|
| | Flag bit(s) | NDI bitmap | MCS | Resource assignment |
| 1 | Flag = 1 | 1 bit | 4 bit | 5 bit |
| 2 | | 2 bit | 4 bit | 5 bit |
| Others | Flag = 0 (Or Not exist) | Y bit | 3 bit | 4 bit |

Table 13 tabulates an example of designing some areas of DCI fields by combining Option 2-2, Option 2-3, Option 2-4, and Option 2-5, when up to 8 TBs are schedulable by one DCI. In the example of the following table, when the number of scheduled TBs is 1 or 2, the sizes of DCI fields representing an MCS and an RA are 4 bits and 5 bits, respectively, and in the other cases, they are 3 bits and 4 bits, respectively. In the following example, the size of bits representing an RA means a required minimum number of bits, and 1 to 4 bits may be added according to the size of a bandwidth in which a PDSCH may be transmitted.

TABLE 13

| Number of scheduled TBs | Size of DCI fields | | | |
|---|---|---|---|---|
| | Number of TBs & HARQ process IDs | NDI bitmap | MCS | Resource assignment |
| 1 | 9 bit | 1 bit | 4 bit | 5 bit |
| 2 | 8 bit | 2 bit | 4 bit | 5 bit |
| 4 | 8 bit | 4 bit | 3 bit | 4 bit |
| 6 | 6 bit | 6 bit | 3 bit | 4 bit |
| 8 | 4 bit | 8 bit | 3 bit | 4 bit |

When the size of the DCI field representing an MCS/TBS and the size of the DCI field representing an RA are limited by the number of scheduled TBs as in Option 2-3, Option 2-4, and Option 2-5, scheduling flexibility may be limited. To compensate for the limitation, a method of semi-statically configuring information represented by the decreased DCI fields by higher-layer signaling such as an SIB or RRC signaling may be considered. For example, when 2 bits are used for the DCI field representing an MCS in Table 11, an MCS index indicated by the 2 bits may be determined by (or in conjunction with) RRC signaling.

(Method 3)

In Method 3 of the present disclosure, multi-TB scheduling is considered to dynamically schedule one or more TBs by one DCI. Further, a case in which the BS may set a maximum number of TBs schedulable by one DCI is considered. For example, the BS may indicate the maximum number of TBs schedulable by one DCI by higher-layer signaling such as an SIB or RRC signaling.

In Method 3 of the present disclosure, it is proposed that the number of bits and information of each field in DCI are different according to the maximum number of TBs scheduled by one DCI, set by the BS. In a characteristic example, the DCI fields may include a bitmap representing NDI information of TBs, an MCS/TBS for the scheduled TBs, an RA, and other scheduling information. In the case where a structure of scheduling a plurality of TBs is supported, the proposed method may overcome the increase of the total number of DCI bits caused by an increase in the number of pieces of information required for each TB, proportional to the number of TBs schedulable by one DCI, and allow determination of an appropriate total number of DCI bits by evaluating the importance of network overhead and DCI decoding performance and their influence on performance.

When the proposed method of Method 3 is applied, the BS indicates a maximum number of TBs schedulable by one DCI by a higher-layer signal, and the number of DCI bits is set accordingly, the number of actual TBs scheduled by the DCI may be determined based on information included in the DCI. Further, a method of differentiating the sizes and interpretation of the remaining fields in the DCI according to the number of actually scheduled TBs may also be used. For example, the proposed methods of Method 1, Method 1-A, Method 1-B, and/or Method 2 proposed in the present disclosure may be used in combination with Method 3.

The proposed method of Method 3 may be configured by combining one or more of the following options.

(Option 3-1) Method 3 may include a method of determining the size of a field that may represent the NDIs of scheduled TBs according to the maximum number of TBs schedulable by one DCI, like Option 3-1. Characteristically, a method of determining the size of a field available as a bitmap representing the NDIs in proportion to the maximum number of TBs schedulable by one DCI may be considered. For example, when up to 8 HARQ processes may be supported as in CE mode A of MTC, and the BS designates up to $N_{TB}(\leq 8)$ TBs schedulable by one DCI, the size of the field available as an NDI bitmap may be set to up to $N_{TB}$ bits. Compared to DCI that may schedule all of 8 TBs, $(8-N_{TB})$ bits may be reduced. The field available as an NDI bitmap may serve as the NDI bitmap or may be used partially to represent other information, according to the number of actually scheduled TBs.

(Option 3-2) Method 3 may include a method of determining the size of a field representing an MCS/TBS according to the maximum number of TBs schedulable by one DCI, like Option 3-2. Characteristically, as the maximum number of TBs schedulable by one DCI increases, a method of reducing the size of the field representing an MCS/TBS may be used. On the other hand, when the maximum number of TBs schedulable by one DCI is less than or equal to a specific value, the size of the field representing an MCS/TBS may be set to the maximum size of the DCI field available for an MCS/TBS purpose (e.g., the size of a DCI field for the MCS/TBS purpose used in the legacy DCI for single-TB scheduling only). For example, in MTC CE mode A, when the maximum number of TBs schedulable by one DCI, set by the BS is less than or equal to a specific number (or $N_{thr}$), the size of the DCI field that determines an MCS is 4 bits. Herein, the 4 bits may be subjected to the same MCS interpretation method as when the BS designates single-TB scheduling DCI. On the other hand, in the example of MTC CE mode A, when the maximum number of TBs schedulable by one DCI, set by the BS is greater than the specific number (or $N_{thr}$), the number of bits available for the DCI field determining an MCS may be set to 4 or less.

(Option 3-3) Method 3 may include a method of determining the size of a field indicating an RA according to the maximum number of TBs schedulable by one DCI, like Option 3-3. Characteristically, as the maximum number of TBs schedulable by one DCI increases, a method of reducing the size of the field representing RA information may be used. This may be intended to ensure scheduling flexibility at the same level as the legacy single-TB scheduling DCI under some condition (e.g., the maximum number of TBs schedulable by one DCI is less than or equal to a certain value), even though the size of the field for an RA purpose is decreased to reduce the total number of DCI bits. For example, in MTC CE mode A, when the maximum number of TBs schedulable by one DCI, set by the BS is less than or equal to a specific number (or $N_{thr}$), the minimum size of the DCI field that determines an RA is 5 bits. Herein, the 5 bits may be subjected to the same RA interpretation method as when the BS designates single-TB scheduling DCI. On the other hand, in the example of MTC CE mode A, when the maximum number of TBs schedulable by one DCI, set by the BS is greater than the specific number (or $N_{thr}$), the number of bits available for the DCI field determining an RA may be set to 4 or less.

(Option 3-4) Method 3 may include a method of determining the size of a DCI field indicating FH and/or an RV according to the maximum number of TBs schedulable by one DCI, like Option 3-4. Characteristically, according to the maximum number of TBs schedulable by one DCI, one of the methods of configuring FH and/or an RV proposed in Method 1 (e.g., refer to the descriptions of Method 1, Method 1-A, and Method 1-B) may be selected, or the FH and RV configuration method used in the legacy DCI may be selected. For example, in MTC CE mode A, in the case where the maximum number of TBs schedulable by one DCI, set by the BS is less than or equal to a specific value (or $N_{thr}$), when the size of the DCI field determining FH is 1 bit, and the size of the DCI field determining an RV is 2 bits, the same interpretation method as when the BS designates single-TB scheduling DCI may be applied to the DCI fields. On the other hand, when the maximum number of TBs schedulable by one DCI, set by the BS is greater than the specific value (or $N_{thr}$), one of the methods proposed in Method 1 (e.g., refer to the descriptions of Method 1, Method 1-A, and Method 1-B) may be applied.

As described above, the method of differentiating the sizes and interpretation of the remaining fields in DCI according to the number of actually scheduled TBs may be used together. For example, regarding an RV/FH, Method 3 may be used in combination with the proposed methods of Method 1, Method 1-A, and Method 1-B. In this case, the maximum number of TBs schedulable by one DCI may be replaced with the number of TBs scheduled by DCI.

In a more specific example, in the case where the methods proposed in Method 1, Method 1-A, and Method 1-B are used in combination with Method 3, when the number of TBs scheduled by DCI is equal to or less than a specific value (or $N_{thr}$), a 2-bit DCI field may be used/allocated for an RV for the specific number of (or $N_{thr}$) TBs, and a 1-bit DCI field may be used/allocated for FH for the specific number of (or $N_{thr}$) TBs in the same manner as single-TB scheduling DCI. When the number of TBs scheduled by the DCI is greater than the specific value (or $N_{thr}$), the numbers of bits of the DCI fields for the RV and FH of the specific number of (or $N_{thr}$) TBs may be determined according to the methods proposed in Method 1, Method 1-A, and Method 1-B. For example, when Method 1 (e.g., the method related to Table 9 or Method 1-B) is applied, a 1-bit field indicating the RV and FH of the specific number of (or $N_{thr}$) TBs may be used/allocated in the DCI. When Method 1 (e.g., the method related to Table 7 or Table 8) is applied, a 2-bit field indicating the RV and FH of the specific number of (or $N_{thr}$) TBs may be used/allocated in the DCI.

In this example, when the number of TBs scheduled by the DCI is less than or equal to the specific value (or $N_{thr}$), the same method as the single-TB scheduling DCI may be applied, and thus the specific value (or $N_{thr}$) may be 1. Therefore, the BS may determine the number of TBs to be scheduled for the UE, generate DCI including a 2-bit field indicating an RV for one TB and a 1-bit field indicating FH for the one TB, when the number of TBs to be scheduled is 1 or DCI including a 1-bit field (e.g., refer to the method related to Table 9 or Method 1-B) or a 2-bit field (e.g., refer to the method related to Table 7 or Table 8) indicating an RV and/or FH for a plurality of TBs, when the number of TBs to be scheduled is greater than 1, and then transmit the generated DCI to the UE (e.g., S1704). The BS may transmit the TB(s) scheduled based on the transmitted DCI to the UE or receive the TB(s) from the UE (e.g., S1706). The UE may receive the DCI scheduling one or more TBs from the BS (e.g., S1804). When the number of scheduled TBs is 1, the UE may obtain 2-bit information indicating an RV for one TB and 1-bit information indicating FH for the one TB. When the number of scheduled TBs is greater than 1, the UE may obtain 1-bit information indicating an RV and/or FH for a plurality of TBs (e.g., refer to the method related to Table 9 or Method 1-B) or 2-bit information indicating the RV and/or FH of the plurality of TBs indicating FH (e.g., refer to the method related to Table 7 or Table 8) from the received DCI. The UE may determine whether to apply the RV and FH based on the information obtained from the DCI, and may receive or transmit the scheduled TB(s) from or to the BS (e.g., S1806).

(Option 3-A) Method 3 may include a method of determining whether to apply the methods proposed in Method 2 according to the maximum number of TBs schedulable by one DCI, like Option 3-A. For example, in MTC CE mode A, when the maximum number of TBs schedulable by one DCI, set by the BS is less than or equal to a specific value (or $N_{thr}$), the size of a DCI field that determines an MCS is always 4 bits, and the 4-bit region may represent the same MCS information regardless of the number of scheduled TBs. On the other hand, in the above example of MTC CE mode A, when the maximum number of TBs schedulable by one DCI, set by the BS is greater than the specific value (or $N_{thr}$), the size and interpretation of the DCI field representing an MCS/TBS may be determined to be different according to the number of actually scheduled TBs, as in the method proposed in Option 2-3. While the above example has been described in the context of the DCI field determining an MCS/TBS, the principle of the proposed method may be applied to other DCI fields (e.g., RA, FH, and/or RV) to which Method 3 is applicable.

(Method 4)

In Method 4 of the present disclosure, multi-TB scheduling is considered to dynamically schedule one or more TBs by one DCI. For example, the BS may dynamically configure the number of scheduled TBs for the UE by DCI.

In Method 4 of the present disclosure, a method of differentiating the size and interpretation of a DCI field indicating MCS/TBS information for scheduled TBs or a DCI field indicating RV and/or FH information for the scheduled TBs according to the number of TBs dynamically scheduled by DCI is proposed. The proposed method may be used to dynamically determine the scheduling flexibility of an RV and FH based on the property that each field included in DCI requires a different degree of scheduling flexibility according to the number of scheduled TBs.

For the size and interpretation of a DCI field indicating an RV and FH in Method 4, the proposed methods of Method 1 (e.g., refer to the descriptions of Method 1, Method 1-A, and Method 1-B) may be used. For example, the DCI field indicating an RV and FH may be interpreted by selecting one of the tables (e.g., Table 7 to Table 10) proposed in Method 1 according to the number of TBs scheduled by the corresponding DCI. Alternatively, for the size and interpretation of the DCI field indicating an RV and FH, the DCI field indicating an RV and FH defined in the legacy DCI (e.g., 2 bits for an RV and 1 bit for FH) may be used. In a more specific example, when the number of TBs scheduled by DCI is equal to or larger than a specific value (e.g., 2), the DCI field indicating an RV and FH may be used/allocated according to one of the methods proposed in Method 1 (e.g., refer to the descriptions of Method 1, Method 1-A, and Method 1-B). When the number of TBs scheduled by the DCI is less than the specific value (e.g., 2), the same DCI field for an RV and FH as used in the legacy DCI may be used/allocated.

In one of specific methods proposed in Method 4, when the number of TBs scheduled by DCI is 1, P bits may be used to represent an RV and FH. When the number of TBs scheduled by the DCI is 2 or more, Q (<P) bits may be used to represent an RV and FH. P and Q are positive integers.

For example, a 2-bit RV field and a 1-bit FH field may be separately used/allocated in the legacy DCI, whereas P=3 and Q=1 in Method 1 (e.g., the method related to Table 9 or Method 1-B). In this example, the BS may determine the number of TBs to be scheduled for the UE. When the number of TBs to be scheduled is 1, the BS may generate DCI including a 2-bit field indicating an RV for the one TB and a 1-bit field indicating FH for the one TB, whereas when the number of TBs to be scheduled is 2 or more, the BS may generate DCI including a 1-bit field indicating an RV or FH for the plurality of TBs. Then, the BS may transmit the generated DCI to the UE (e.g., S1704). The BS may transmit or receive the scheduled TB(s) to or from the UE based on the transmitted DCI (e.g., S1706). The UE may receive the DCI scheduling one or more TBs from the BS (e.g., S1804). When the number of scheduled TBs is 1, the UE may obtain 2-bit information indicating an RV for one TB and 1-bit information indicating FH for the one TB. When the number of scheduled TBs is greater than 1, the UE may obtain 1-bit information indicating an RV and/or FH for the plurality of TBs. The UE may determine the RV and whether to apply FH based on the information obtained from the DCI, and may receive or transmit the scheduled TB(s) from or to the BS (e.g., S1806).

In another example, a 2-bit RV field and a 1-bit FH field may be separately used/allocated in the legacy DCI, whereas P=3 and Q=1 in Method 1 (e.g., the method related to Table 7 or Table 8). In this example, the BS may determine the number of TBs to be scheduled for the UE. When the number of TBs to be scheduled is 1, the BS may generate DCI including a 2-bit field indicating an RV for the one TB and a 1-bit field indicating FH for the one TB, whereas when the number of TBs to be scheduled is 2 or more, the BS may generate DCI including a 2-bit field indicating an RV or FH for the plurality of TBs. Then, the BS may transmit the generated DCI to the UE (e.g., S1704). The BS may transmit or receive the scheduled TB(s) to or from the UE based on the transmitted DCI (e.g., S1706). The UE may receive the DCI scheduling one or more TBs from the BS (e.g., S1804). When the number of scheduled TBs is 1, the UE may obtain 2-bit information indicating an RV for the one TB and 1-bit information indicating FH for the one TB. When the number of scheduled TBs is 2 or more, the UE may obtain 2-bit information indicating an RV and/or FH for the plurality of TBs. The UE may determine the RV and whether to apply FH based on the information obtained from the DCI, and may receive or transmit the scheduled TB(s) from or to the BS (e.g., S1806).

This may be intended to ensure scheduling flexibility at the same level as or a similar level to that of the legacy DCI, when the BS is to schedule only one TB.

In one of specific methods proposed in Method 4, when the number of TBs scheduled by DCI is 1, P bits may be used to indicate an MCS/TBS, whereas when a plurality of TBs are scheduled by DCI, Q (<P) bits may be used to represent an MCS/TBS. For example, P=4 and Q=3. This may be intended to ensure scheduling flexibility at the same level as or a similar level to that of the legacy DCI, when the BS is to schedule only one TB.

G. Communication System and Devices to Which the Present Disclosure is Applied

Various descriptions, functions, procedures, proposals, methods, and/or flowcharts of the present disclosure may be applied to, but not limited to, various fields requiring wireless communication/connection (e.g., 5G) among devices.

Hereinafter, they will be described in more detail with reference to the drawings. In the following drawings/description, the same reference numerals may denote the same or corresponding hardware blocks, software blocks, or functional blocks, unless specified otherwise.

Figure 20:
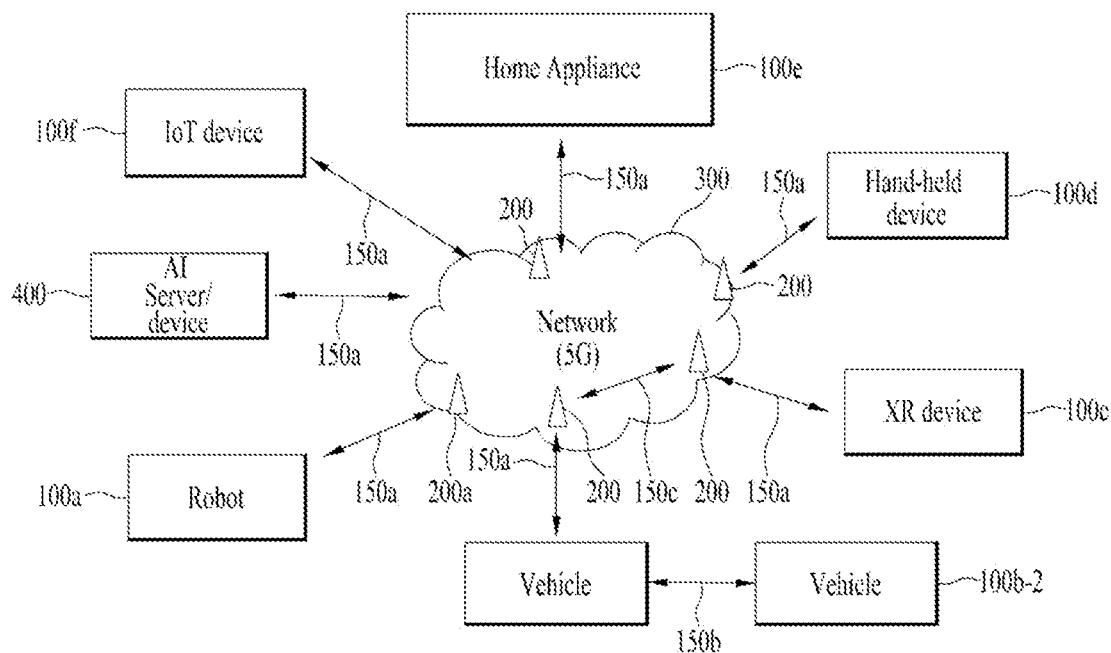
FIG. 20 is a diagram illustrating an exemplary communication system applied to the present disclosure.

FIG. 20 illustrates a communication system 1 applied to the present disclosure.

Referring to FIG. 20, the communication system 1 applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
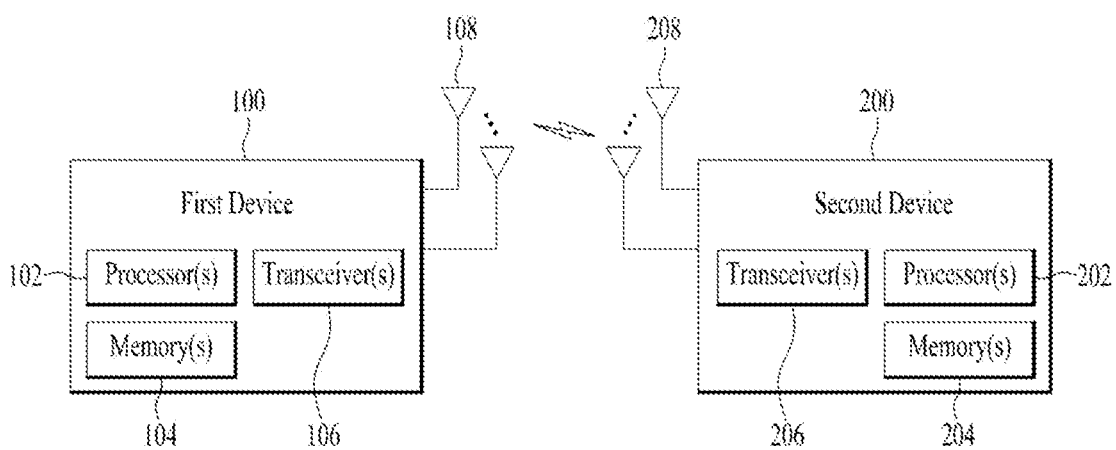
FIG. 21 is a diagram illustrating an exemplary wireless device applied to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 20.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
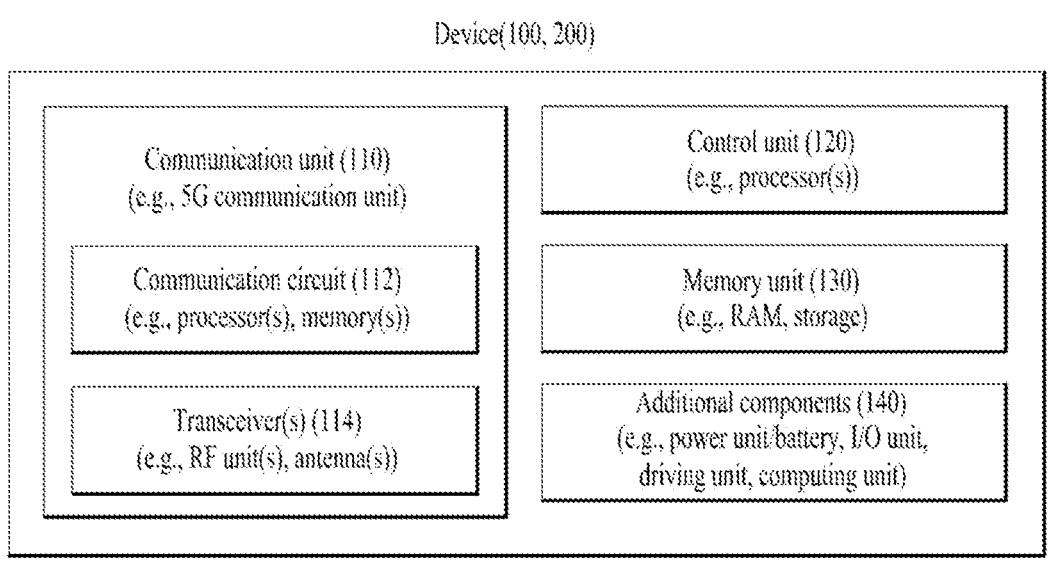
FIG. 22 is a diagram illustrating another exemplary wireless device applied to the present disclosure.

FIG. 22 illustrates another example of wireless devices applied to the present disclosure. The wireless devices may be implemented in various forms according to use-cases/services (refer to FIG. 20).

Referring to FIG. 22, wireless devices 100 and 200 may correspond to the wireless devices 100 and 200 of FIG. 21 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcasting terminal, a hologram device, a public safety device, an MTC device, a medicine device, a FinTech device (or a finance device), a security device, a climate/environment device, the AI server/device (400 of FIG. 20), the BSs (200 of FIG. 20), a network node, etc. The wireless device may be mobile or fixed according to a use-case/service.

In FIG. 22, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 22 will be described in detail with reference to the drawings.

Figure 23:
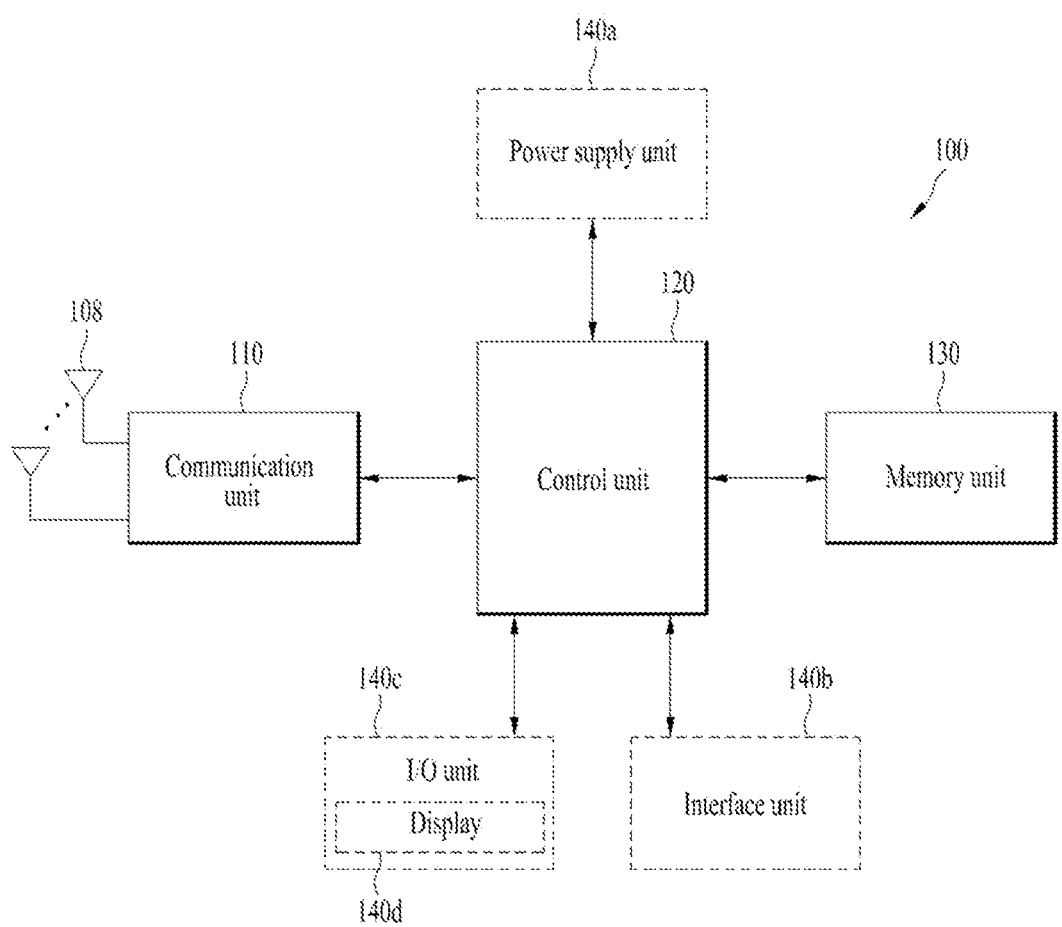
FIG. 23 is a diagram illustrating an exemplary portable device applied to the present disclosure.

FIG. 23 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 23, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 22, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 24:
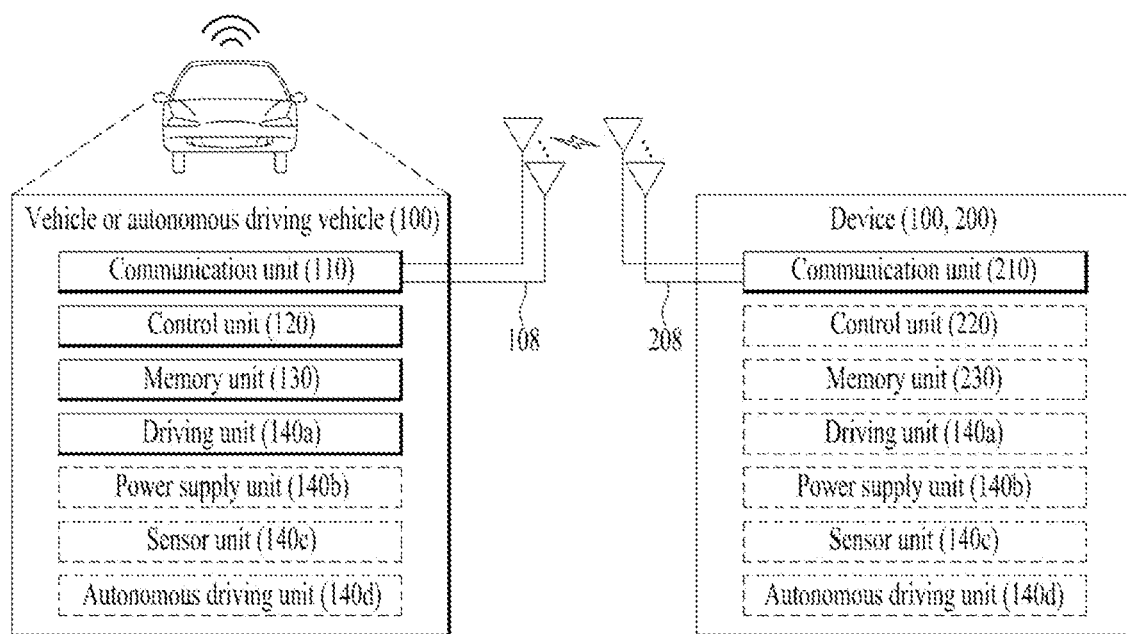
FIG. 24 is a diagram illustrating an exemplary vehicle or autonomous driving vehicle applied to the present disclosure.

FIG. 24 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to wireless communication devices such as a user equipment (UE) and a base station (BS) operating in various wireless communication systems including 3GPP LTE/LTE-A/5G (or New RAT (NR)).

What is claimed is:

1. A method performed by a user equipment (UE) in a wireless communication system, the method comprising:
    receiving downlink control information (DCI) for scheduling multiple transport blocks; (TBs) and
    receiving the multiple TBs based on the DCI,
    wherein, based on a repetition number of the multiple TBs being 1, a specific 1-bit of the DCI is set to redundancy version (RV) information,
    wherein, based on the repetition number being greater than 1, the specific 1-bit is set to frequency hopping information other than the RV information, and
    wherein, based on a number of the multiple TBs being less than 8, the DCI includes hybrid automatic repeat request (HARQ) process identifier (ID) offset information for determining HARQ process IDs of the multiple TBs.

2. The method according to claim 1, further comprising:
    based on the repetition number being 1, determining that frequency hopping is disabled for the multiple TBs.

3. The method according to claim 1, wherein the RV information is either one of RV0 or RV2.

4. The method according to claim 1, further comprising:
    based on the repetition number being greater than 1 an RV value is a fixed value.

5. The method according to claim 1, wherein the multiple TBs are received through a physical downlink shared channel (PDSCH).

6. The method according to claim 5, wherein the UE is not configured to use 64-quadrature amplitude modulation (64 QAM) for the PDSCH.

7. The method according to claim 1, wherein the DCI schedules up to 8 TBs.

8. A non-transitory computer-readable storage medium storing instructions which, when executed by a processor, cause the processor to perform the method according to claim 1.

9. The method of claim 1, wherein, based on the number of the multiple TBs being 8, the DCI does not include the HARQ process ID offset information.

10. A device configured to operate in a wireless communication system, the device comprising:
    a memory configured to store instructions; and
    a processor configured to execute the instructions to perform operations comprising:
    receiving downlink control information (DCI) for scheduling multiple transport blocks (TBs); and
    receiving the multiple TBs based on the DCI,
    wherein, based on a repetition number of the multiple TBs being 1, a specific 1-bit of the DCI is set to redundancy version (RV) information,
    wherein, based on the repetition number being greater than 1, the specific 1-bit is set to frequency hopping information other than the RV information, and
    wherein, based on a number of the multiple TBS being less than 8, the DCI includes hybrid automatic repeat request (HARQ) process identifier (ID) offset information for determining HARQ process IDs of the multiple TBs.

11. The device according to claim 10, further comprising:
    a transceiver configured to transmit or receive wireless signals under control of the processor.

12. The device according to claim 10, wherein the device is a user equipment (UE) configured to operate in a wireless communication system.

13. The device according to claim 10, wherein the device is an application specific integrated circuit (ASIC) or a digital signal processing device.

14. A method performed by a base station (BS) in a wireless communication system, the method comprising:
    generating downlink control information (DCI) for scheduling multiple transport blocks (TBs);
    transmitting the DCI to a user equipment (UE); and
    transmitting the multiple TBs based on the DCI,
    wherein, based on a repetition number of the multiple TBs being 1, a specific 1-bit of the DCI is set to redundancy version (RV) information,
    wherein, based on the repetition number being greater than 1, the specific 1-bit is set to frequency hopping information other than the RV information, and
    wherein, based on a number of the multiple TBs being less than 8, the DCI includes hybrid automatic repeat request (HARQ) process identifier (ID) offset information for indicating HARQ process IDs of the multiple TBs.

15. A device configured to operate in a wireless communication system, the device comprising:
a memory configured to store instructions; and
a processor configured to execute the instructions to perform operations comprising:
generating downlink control information (DCI) for scheduling multiple transport blocks (TBs);
transmitting the DCI to a user equipment (UE); and
transmitting the multiple TBS based on the DCI,
wherein, based on a repetition number of the multiple TBs being 1, a specific 1-bit of the DCI is set to redundancy version (RV) information,
wherein, based on the repetition number being greater than 1, the specific 1-bit is set to frequency hopping information other than the RV information, and
wherein, based on a number of the multiple TBs being less than 8, the DCI includes hybrid automatic repeat request (HARQ) process identifier (ID) offset information for indicating HARQ process IDs of the multiple TBs.

* * * * *